(12) United States Patent
Stauth et al.

(10) Patent No.: US 6,693,419 B2
(45) Date of Patent: Feb. 17, 2004

(54) PROXIMITY DETECTOR

(75) Inventors: Jason T. Stauth, Concord, NH (US); P. Karl Scheller, Bow, NH (US); Glenn A. Forrest, Nottingham, NH (US); Ravi Vig, Bow, NH (US); Jay M. Towne, Newbury, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 69 days.

(21) Appl. No.: 10/156,684

(22) Filed: May 28, 2002

(65) Prior Publication Data

US 2003/0222637 A1 Dec. 4, 2003

(51) Int. Cl.$^7$ ............................ G01B 7/14; G01B 7/30; G01P 3/48
(52) U.S. Cl. ................. 324/207.12; 324/207.2; 324/207.25; 324/166; 327/511
(58) Field of Search ............... 324/207.25, 207.2, 324/207.21, 207.26, 207.12, 225, 173, 174, 166; 338/32 H, 32 R; 327/510, 511

(56) References Cited

U.S. PATENT DOCUMENTS

| | | | |
|---|---|---|---|
| 5,442,283 A | 8/1995 | Vig et al. | 324/207.06 |
| 5,729,130 A | 3/1998 | Moody et al. | 324/207.12 |
| 5,917,320 A | 6/1999 | Scheller et al. | 324/166 |
| 6,091,239 A | 7/2000 | Vig et al. | 324/207.2 |
| 6,297,627 B1 * | 10/2001 | Towne et al. | 324/207.12 |

* cited by examiner

*Primary Examiner*—Walter E. Snow
*Assistant Examiner*—Renna Aurora
(74) *Attorney, Agent, or Firm*—Daly, Crowley & Mofford, LLP

(57) ABSTRACT

A proximity detector includes an offset circuit for bringing at least one of a magnetic field signal and a tracking signal towards the other one of the magnetic field signal and the tracking signal when the detector output signal changes state. A magnetic field-to-voltage transducer provides the magnetic field signal indicative of an ambient magnetic field and a peak detector responsive to the magnetic field signal provides the tracking signal which substantially follows the magnetic field signal. A comparator generates the detector output signal which changes state when the magnetic field signal varies from the tracking signal by a predetermined amount.

20 Claims, 18 Drawing Sheets

PROXIMITY DETECTOR

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates to proximity detectors and more particularly to a proximity detector providing close tracking of a magnetic field signal.

BACKGROUND OF THE INVENTION

Proximity detectors for detecting ferrous, or magnetic articles are known. One application for such devices is in detecting the approach and retreat of each tooth of a rotating ferrous gear. The magnetic field associated with the ferrous article is detected by a magnetic field-to-voltage transducer, such as a Hall element or a magnetoresistive device, which provides a signal proportional to the detected magnetic field (i.e., the magnetic field signal). The proximity detector processes the magnetic field signal to generate an output signal which changes state each time the magnetic field signal crosses a threshold signal.

In one type of proximity detector, sometimes referred to as a peak-to-peak percentage detector, the threshold signal is equal to a percentage of the peak-to-peak magnetic field signal. One such peak-to-peak percentage detector is described in U.S. Pat. No. 5,917,320 entitled DETECTION OF PASSING MAGNETIC ARTICLES WHILE PERIODICALLY ADAPTING DETECTION THRESHOLD and assigned to the assignee of the present invention. In another type of proximity detector, sometimes referred to as a slope-activated or a peak-referenced detector and described in U.S. Pat. No. 6,091,239 entitled DETECTION OF PASSING MAGNETIC ARTICLES WITH A PEAK REFERENCED THRESHOLD DETECTOR which is assigned to the assignee of the present invention, the threshold signal differs from the positive and negative peaks (i.e., the peaks and valleys) of the magnetic field signal by a predetermined amount. Thus, in this type of detector, the output signal changes state when the magnetic field signal comes away from a peak or valley by the predetermined amount.

In order to accurately detect the proximity of a ferrous article, the detector must be capable of closely tracking the magnetic field signal. Typically, one or more digital-to-analog converters (DACs) are used to generate a signal which tracks the magnetic field signal. For example, in the above-referenced U.S. Pat. Nos. 5,917,320 and 6,091,239, two DACs, a PDAC and an NDAC, are used; one to track the positive peaks of the magnetic field signal and the other to track the negative peaks of the magnetic field signal.

Referring to FIG. 1, a peak-referenced proximity detector 10 which uses a single DAC 28 to track a magnetic field signal, DIFF, is shown. A Hall element 14 generates a differential signal proportional to the ambient magnetic field, which signal is amplified by an amplifier 16 to provide the DIFF signal. The DIFF signal is coupled to a non-inverting input of a tracking comparator 20 which receives, at the inverting input, the output signal, PEAKDAC, of the DAC 28, as shown. The DIFF signal is further coupled to a non-inverting input of a comparator 40 which receives at the inverting input, the PEAKDAC signal and which generates a POSCOMP output signal. The comparator 40 has hysteresis, here on the order of 100 mV, so that the POSCOMP signal changes state when the DIFF signal exceeds the PEAKDAC signal by approximately 100 mV. The output signal of the comparator 20, COMPOUT, is coupled to an exclusive OR (XOR) gate 36 which additionally receives the POSCOMP signal and which provides a HOLD input signal to an up/down counter 24. Counter 24 is further responsive to a clock signal, CLK, and to the POSCOMP signal for controlling whether counter 24 counts up or down. The output of the counter 24 is converted into the analog tracking PEAKDAC signal by the DAC 28.

As is illustrated in FIG. 2, whenever the DIFF signal exceeds the PEAKDAC signal by the hysteresis level of comparator 20, such as by 100 mV, the COMPOUT signal transitions to a logic high level, thereby causing the counter 24 to count if the POSCOMP signal is also high. Once the counter 24 counts up one step, the COMPOUT signal goes low causing the count value to be held until the DIFF signal exceeds the PEAKDAC signal by 100 mV again. When the DIFF signal reaches a positive peak, as occurs at time t1, the PEAKDAC signal stays above the DIFF signal, thereby causing the HOLD input to the counter 24 to be asserted until the hysteresis of the comparator 40 has been overcome, as occurs when the POSCOMP signal goes low, just before time t2.

When the DIFF signal experiences high frequency fluctuations, as occurs beginning at time t3, the PEAKDAC signal is not able to keep up with the fast changing DIFF signal. More particularly, the DAC 28 counts at its maximum rate (i.e., the PEAKDAC signal experiences its maximum slope, dV/dt) after the POSCOMP signal transitions, such as at time t0, t2, and t3. Between times t4 and t5, the DIFF signal has a slope faster than the maximum dV/dt of the DAC and the PEAKDAC signal does not catch up with the falling DIFF signal until time t5 when the DIFF signal is rising. In this case, the DIFF signal valley occurring between times t4 and t5 is not detected, thereby causing an output transition of the POSCOMP signal to be skipped and a passing magnetic article to go undetected. It will be appreciated that the same potential problem of skipping POSCOMP signal transitions can occur when the DIFF signal has a small amplitude, since the DAC signal will not have time to catch the DIFF signal before it changes direction.

SUMMARY OF THE INVENTION

A proximity detector comprises a magnetic field-to-voltage transducer providing a magnetic field signal indicative of an ambient magnetic field, a peak detector responsive to the magnetic field signal for providing a tracking signal which substantially follows the magnetic field signal, and a comparator for providing a detector output signal which changes state when the magnetic field signal varies from the tracking signal by a predetermined amount. According to the invention, at least one of the tracking signal and the magnetic field signal is forced towards the other one of the tracking signal and the magnetic field signal in response to changes in state of the detector output signal. With this arrangement, the tracking signal closely follows the magnetic field signal, even in response to high frequency and/or low amplitude variations in the magnetic field signal.

Various embodiments are described for forcing at least one of the tracking signal and the magnetic field signal towards the other one of the tracking signal and the magnetic field signal. In some embodiments, the tracking signal is brought to substantially the same level as the magnetic field signal upon transitions of the output signal and in other embodiments, the magnetic field signal is brought to substantially the same level as the tracking signal upon output signal transitions. Alternatively, the tracking signal is brought to a level which is at a fixed offset with respect to the magnetic field signal or the magnetic field signal is brought to a level which is at a fixed offset with respect to the tracking signal.

The predetermined amount by which the magnetic field signal must differ from the tracking signal in order to cause a change of state in the detector output signal may be established by generating a threshold signal, which differs from the tracking signal by the predetermined amount, for use by the comparator or may be established by hysteresis of the comparator. In one embodiment in which a threshold signal is generated, the magnetic field signal and the tracking signal are forced towards each other by interchanging the threshold signal level and the tracking signal level upon transitions of the output signal.

Also described is a method for detecting a ferrous article including the steps of generating a magnetic field signal indicative of an ambient magnetic field, generating a tracking signal which substantially follows the magnetic field signal, generating an output signal which changes state when the magnetic field signal varies from the tracking signal by a predetermined amount, and forcing at least one of the magnetic field signal and the tracking signal towards the other one of the magnetic field signal and the tracking signal upon transitions of the output signal.

BRIEF DESCRIPTION OF THE DRAWINGS

The foregoing features of this invention, as well as the invention itself may be more fully understood from the following description of the drawings in which.

DESCRIPTION OF THE PREFERRED EMBODIMENT

Figure 3:
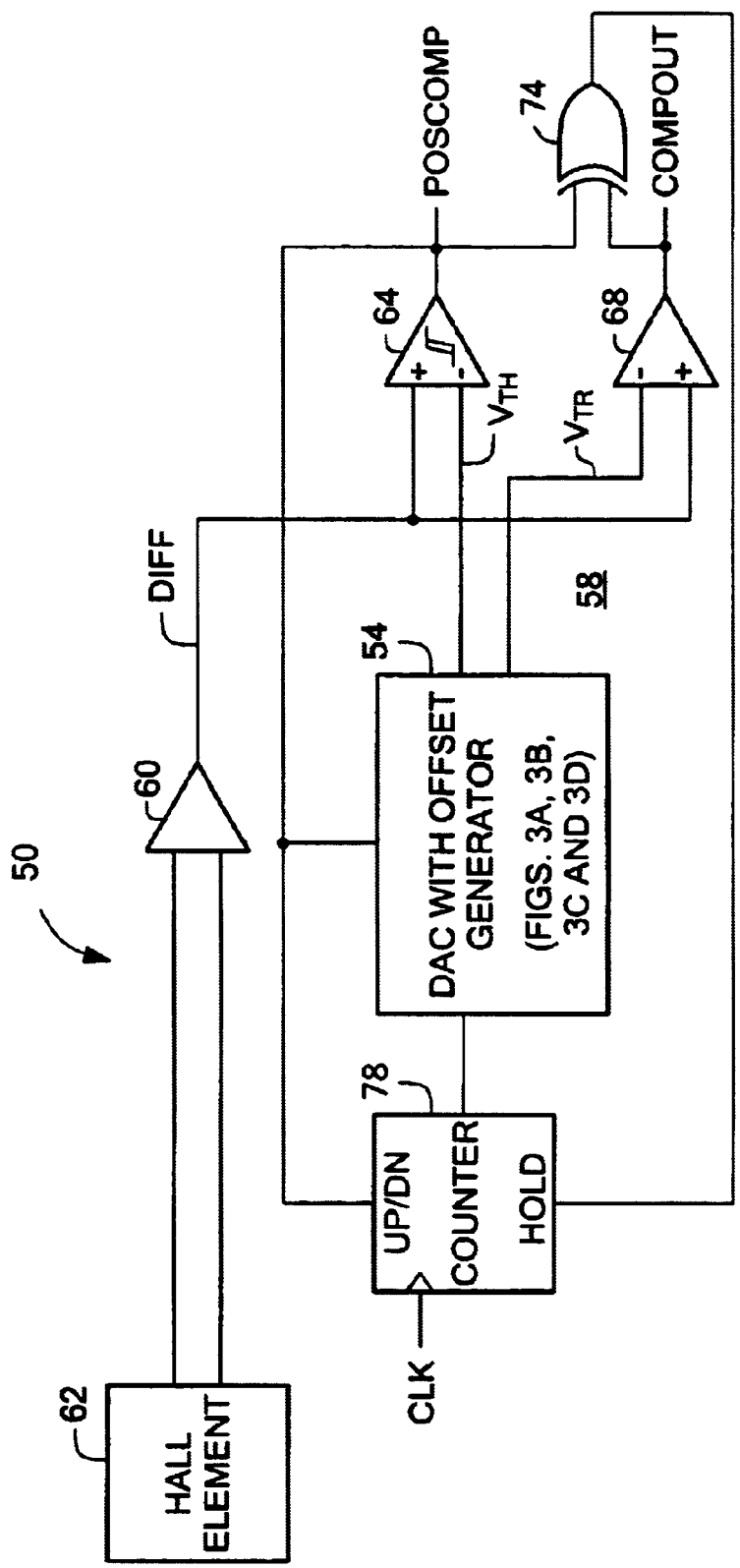
FIG. 3 is a block diagram of a Hall effect proximity detector including a DAC having an offset generator according to the invention.

Referring to FIG. 3, a Hall effect proximity detector 50 includes a peak detector 58 containing a DAC with offset generator 54. The peak detector 58 is responsive to a magnetic field signal, DIFF, for providing a tracking, or following signal, $V_{TR}$, which substantially follows the DIFF signal. A comparator 64 provides an output signal, POSCOMP, which changes state when the DIFF signal varies from the $V_{TR}$ tracking signal by a predetermined amount. According to the invention, at least one of the $V_{TR}$ tracking signal and the DIFF signal is forced towards the other one of the $V_{TR}$ tracking signal and the DIFF signal when the POSCOMP output signal changes state. As examples, the DIFF signal and the $V_{TR}$ tracking signal may be brought to substantially the same level upon transitions of the POSCOMP signal or may be brought to some fixed offset with respect to each other. With this arrangement, the $V_{TR}$ tracking signal closely follows the DIFF signal, since periods of the $V_{TR}$ tracking signal trying to catch up to the DIFF signal following POSCOMP signal transitions are eliminated or at least reduced. As a result, the accuracy of the proximity detector is improved, even in response to high frequency and/or low amplitude variations in the DIFF signal.

The DIFF signal is provided by an amplifier 60 which amplifies the output signal of a Hall effect device 62. It will be appreciated by those of ordinary skill in the art that magnetic field-to-voltage transducers other than a Hall effect device 62, such as a magnetoresistive device, may be used to provide a signal which varies in proportion to the ambient magnetic field. The DIFF signal is coupled to comparator 64 and to a comparator 68. Comparator 64 further receives, at its inverting input, a threshold signal, $V_{TH}$, and provides at its output the POSCOMP detector output signal which changes state when the DIFF signal crosses the $V_{TH}$ threshold signal. The $V_{TH}$ threshold signal differs from the $V_{TR}$ tracking signal by a predetermined amount. More particularly, the POSCOMP signal changes state when the DIFF signal comes away from the preceding positive or negative peak of the DIFF signal by a predetermined amount. Such a peak detector 58 is sometimes referred to as a peak-referenced, or slope-activated detector.

The comparator 68 receives, in addition to the DIFF signal, the $V_{TR}$ tracking signal from the DAC with offset generator 54. Comparator 68 provides at its output a feedback signal, COMPOUT, as shown. The COMPOUT signal and the POSCOMP signal are coupled to an exculsive-OR gate 74 which generates the HOLD input signal to a counter 78. Counter 78 is further responsive to a clock signal, CLK, and to the POSCOMP signal which controls the count direction of the counter 78.

Figure 1:
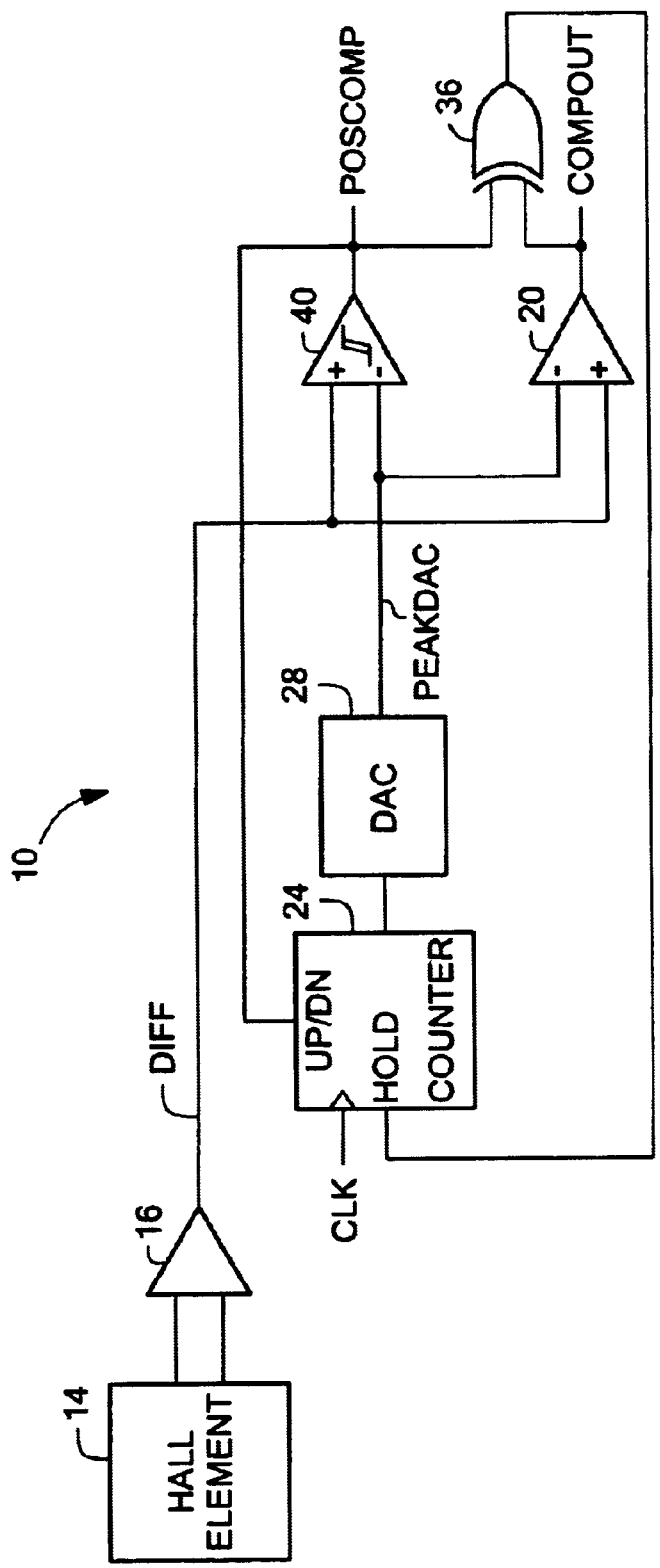
FIG. 1 is a block diagram of a prior art Hall effect proximity detector.
Figure 2:
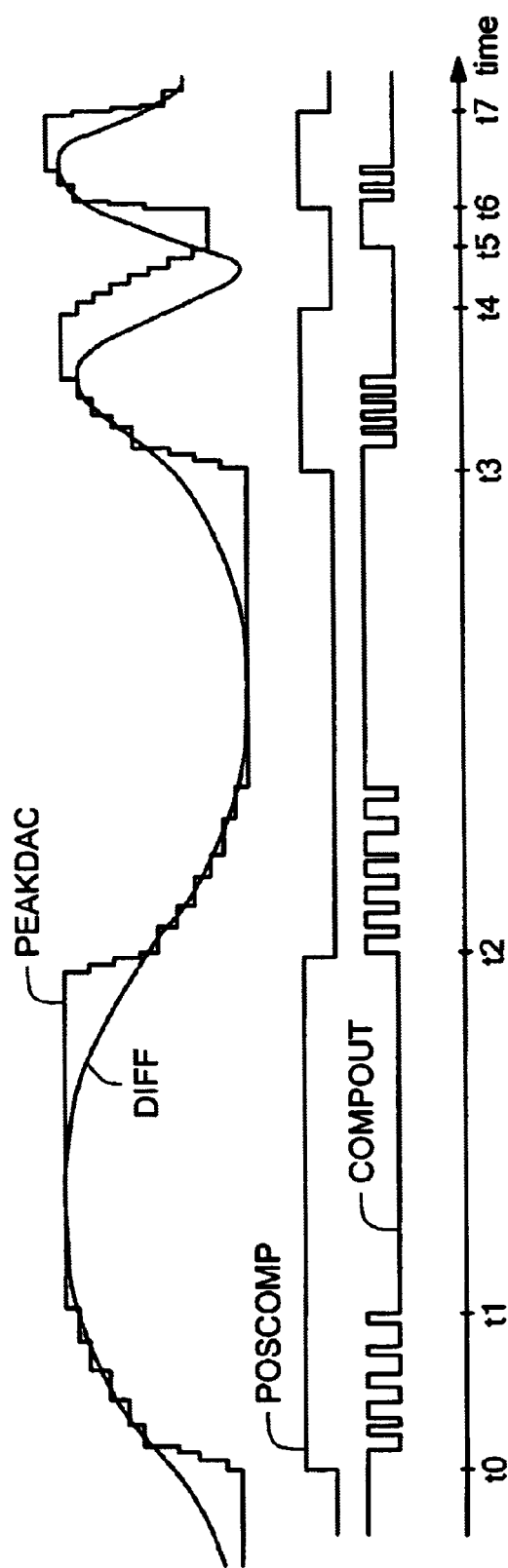
FIG. 2 shows signal waveforms associated with the Hall effect proximity detector of FIG. 1.
Figure 3A:
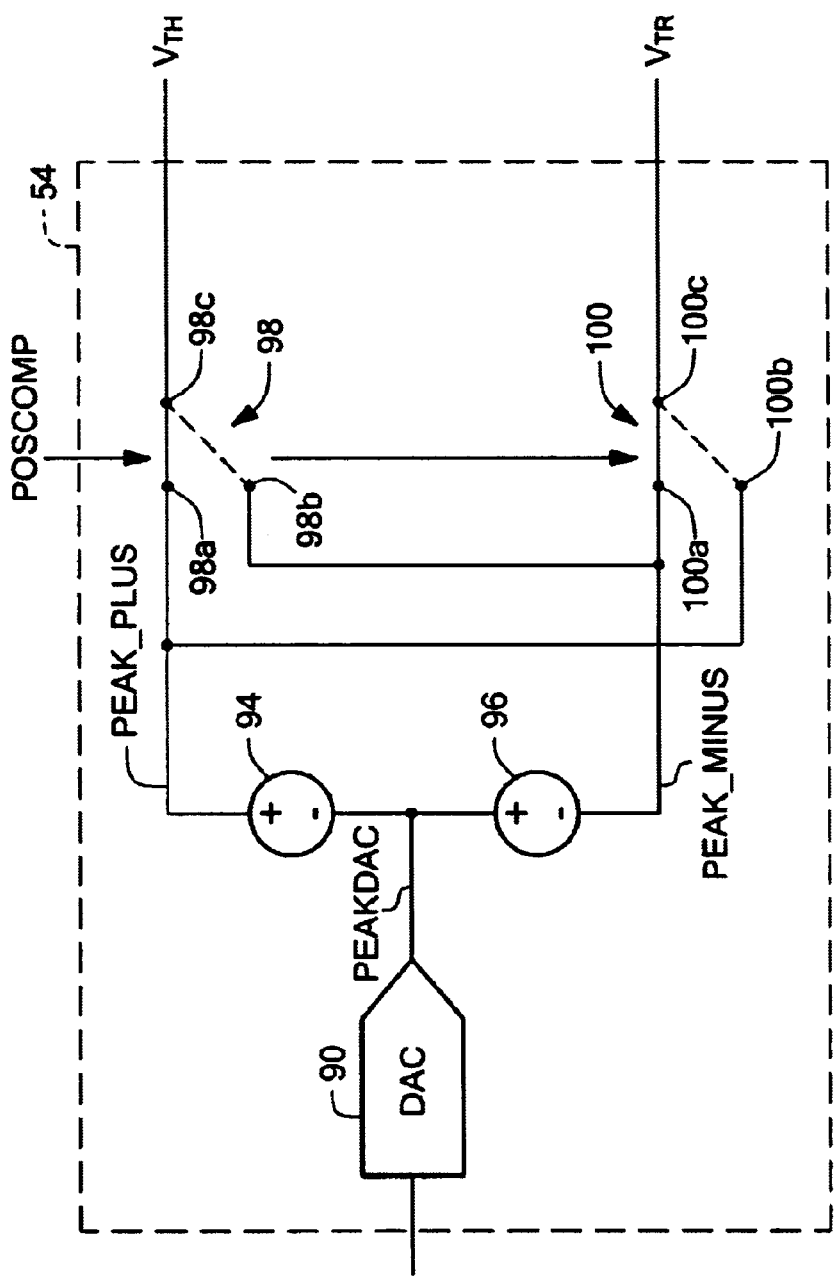
FIG. 3A shows one illustrative DAC having an offset generator for use in the Hall effect proximity detector of FIG. 3.

The proximity detector 50 of FIG. 3 differs from the conventional detector of FIG. 1 in the addition of the offset portion of the circuit 54. The combined circuit 54 generates the $V_{TH}$ threshold signal for coupling to comparator 64 and also generates the $V_{TR}$ tracking signal for coupling to comparator 68. As will become apparent, various circuitry is suitable for providing the DAC with offset generator 54. For example, FIG. 3A shows a DAC with offset generator 54 in which both the $V_{TH}$ threshold signal and the $V_{TR}$ tracking signal are offset from the DAC output signal, PEAKDAC. The DAC with offset generator embodiments 54', 54" of FIGS. 3B and 3C, respectively, provide the $V_{TR}$ tracking signal as the output of the DAC, with the $V_{TH}$ threshold signal at a predetermined offset voltage from the DAC output signal. Finally, the DAC with offset generator 54''' of FIG. 3D implements the offset generator integral to the DAC, in the form of an additional DAC bit. As will be apparent to those of ordinary skill in the art, although the DAC with offset generator 54 is shown in FIG. 3 to provide the $V_{TR}$ tracking signal and the $V_{TH}$ threshold signal, the $V_{TR}$ tracking signal and the $V_{TH}$ threshold signal may be equal, in which case the hysteresis of the comparator 64 is used to establish the predetermined offset between the $V_{TR}$ tracking signal and the DIFF signal which causes transitions in the POSCOMP signal.

Referring also to FIG. 3A, one illustrative DAC with offset generator 54 is shown to include a DAC 90 providing an analog output signal, PEAKDAC, to a first terminal of a first voltage source 94 and to first terminal of a second voltage source 96, as shown. The first voltage source 94 provides at its second terminal, a PEAK_PLUS voltage which is greater than the PEAKDAC signal by the predetermined amount of the offset voltage source 94. Similarly, the second offset voltage source 96 provides at its second terminal a PEAK_MINUS voltage which is less than the PEAKDAC signal by the amount of the offset voltage source 96. In the illustrative embodiment, both of the offset voltage sources 94 and 96 introduce the same offset voltage, here on the order of 50 mV.

The PEAK_PLUS voltage is coupled to an input terminal 98a, 100b of switches 98, 100, respectively. The PEAK_MINUS voltage is coupled to input terminal 98b, 100a of switches 98, 100, respectively, as shown. Under the control of the POSCOMP signal, switches 98 and 100 selectively couple the PEAK_PLUS and PEAK_MINUS voltages to the $V_{TH}$ threshold signal line and the $V_{TR}$ tracking signal line, as shown.

Figure 4:
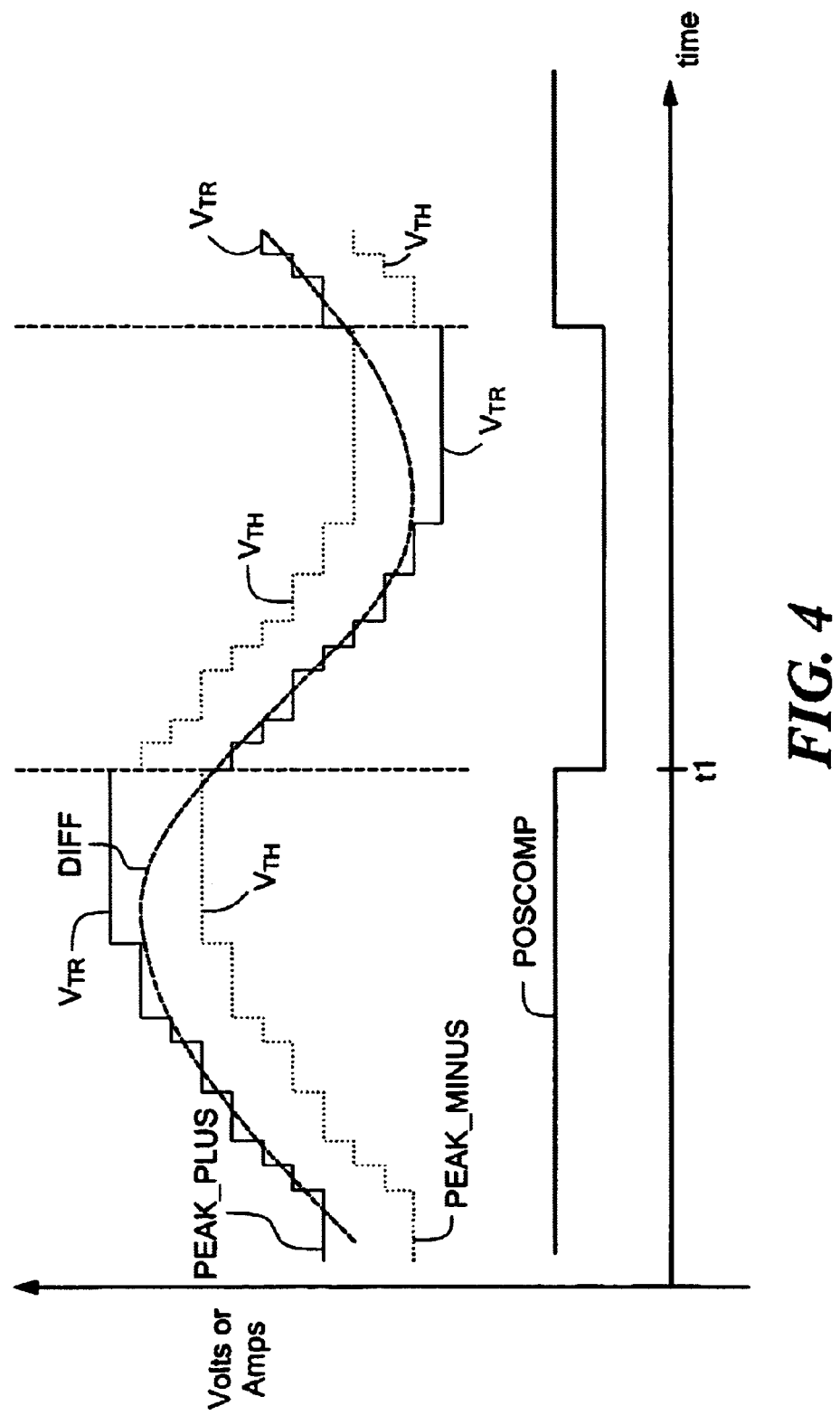
FIG. 4 shows signal waveforms associated with the Hall effect proximity detector of FIGS. 3 and 3A.

Referring also to FIG. 4, the PEAK_PLUS and PEAK_MINUS voltages are shown in relation to an illustrative DIFF signal. Also shown is the POSCOMP signal. When the POSCOMP signal is in a first logic state (e.g., high), the PEAK_PLUS voltage provides the $V_{TR}$ tracking signal (shown by the solid line) and the PEAK_MINUS voltage provides the $V_{TH}$ threshold signal (shown by the dotted line). When the POSCOMP signal changes state, for example at time t1, the $V_{TH}$ threshold signal is pulled up to the PEAK_PLUS voltage level and the $V_{TR}$ tracking signal is pulled down to the PEAK_MINUS voltage level. Stated differently, the switches 98 and 100 toggle so that the PEAK_PLUS voltage provides the $V_{TH}$ threshold signal and the PEAK_MINUS voltage provides the $V_{TR}$ tracking signal. Similarly, when the POSCOMP signal transitions at the time t2, the $V_{TH}$ threshold signal is pulled down to the PEAK_MINUS voltage level and the $V_{TR}$ tracking signal is pulled up to the PEAK_PLUS voltage level. In this way, the $V_{TR}$ tracking signal and the $V_{TH}$ threshold signal are interchanged upon transitions of the POSCOMP signal. Stated differently, the $V_{TR}$ tracking signal is brought to the level of the $V_{TH}$ threshold signal, and thus also to the level of the DIFF signal, upon transitions of the POSCOMP signal. With this arrangement, the $V_{TR}$ tracking signal closely follows the DIFF signal and periods of the $V_{TR}$ tracking signal trying to catch up to the DIFF signal following POSCOMP signal transitions are essentially eliminated.

Figure 5:
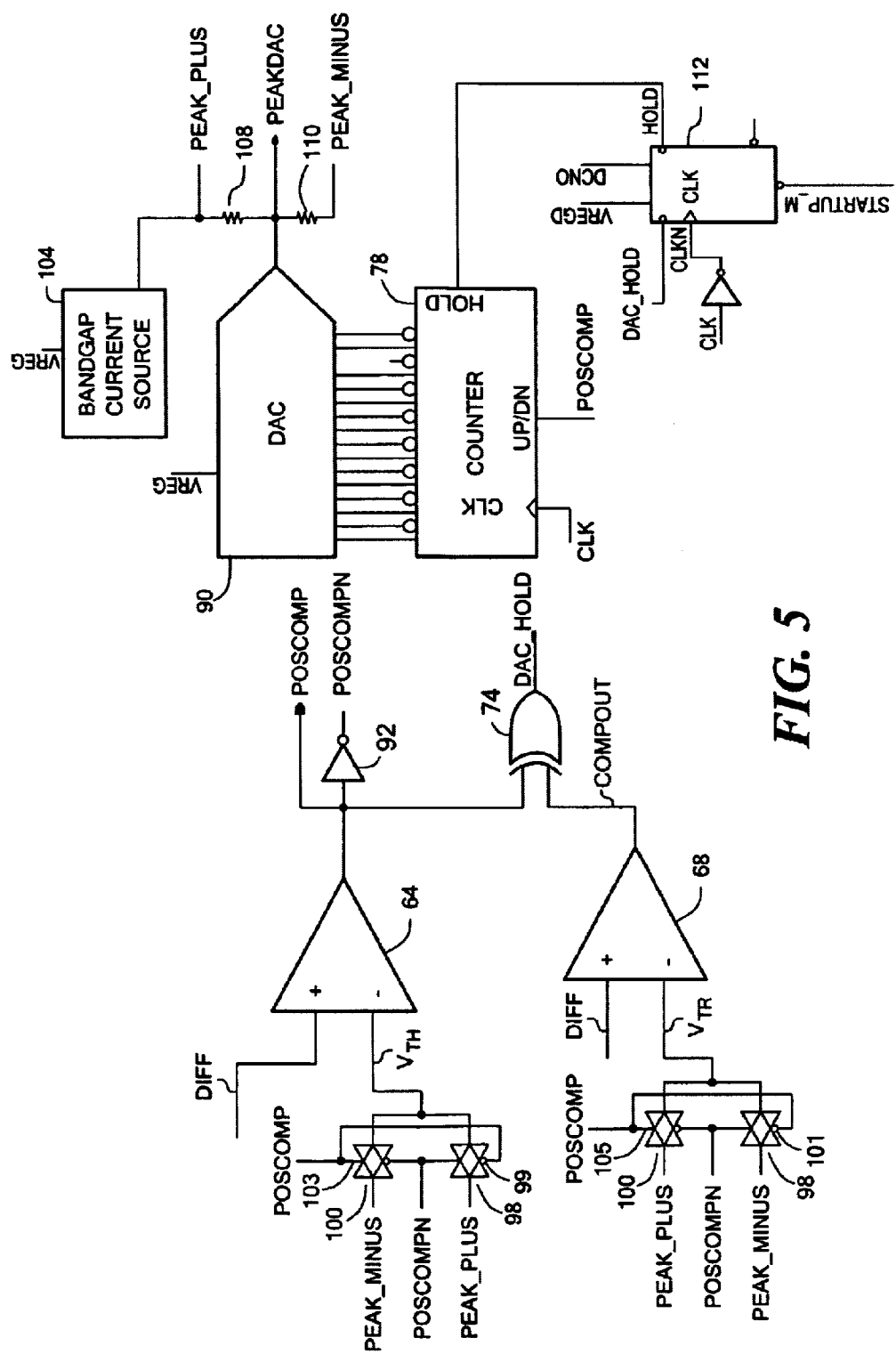
FIG. 5 shows a schematic of the Hall effect proximity detector of FIGS. 3 and 3A.

Referring also to FIG. 5, a schematic of the proximity detector 50 of FIG. 3, including the DAC with offset generator 54 of FIG. 3A, is shown. The DIFF signal is coupled to the non-inverting input of comparators 64 and 68, with the inverting inputs of the comparators receiving the $V_{TH}$ threshold signal and the $V_{TR}$ tracking signal, respectively. The POSCOMP signal and the COMPOUT signal are coupled to XOR gate 74 which provides the HOLD signal to the counter 78. More particularly, the XOR gate 74 provides a DAC_HOLD signal to a flip-flop 112 which, in turn, provides the HOLD signal at its Q output. Use of the flip-flop 112 ensures that HOLD signal transitions are synchronized to the CLK signal. The counter outputs are coupled to inputs of the DAC 90 which provides the PEAKDAC signal at its output.

The offset voltage sources 94 and 96 (FIG. 3A) are implemented with a bandgap current source 104 and series-coupled resistors 108 and 110. In the illustrative embodiment, the bandgap reference 104 provides a current on the order of $10\mu A$ and resistors 108 and 110 are each five Kohm resistors, thereby resulting in a voltage drop across each resistor of 50 millivolts. Thus, the PEAK_PLUS voltage is approximately 50 mV greater than the PEAKDAC voltage and the PEAK_MINUS voltage is approximately 50 mV less than the PEAKDAC voltage.

The PEAK_PLUS and PEAK_MINUS voltages are coupled to switches 98 and 100 (FIG. 3A), as shown. In the illustrative embodiment, each of the switches 98, 100 is implemented with two pairs of MOSFET switches, with each pair comprising an NMOS device in parallel with a PMOS device. For example, switch 98 comprises a first NMOS/PMOS pair 99 which is responsive to the PEAK_PLUS voltage and which has the NMOS device controlled by the POSCOMPN signal (as provided by an inverter 92) and the PMOS device controlled by the POSCOMP signal. The second NMOS/PMOS pair 101 of the switch 98 is responsive to the PEAK MINUS voltage and has the NMOS device controlled by the POSCOMPN signal and the PMOS device controlled by the POSCOMP signal, as shown. Similarly, switch 100 has a first NMOS/PMOS pair 103 having the NMOS device controlled by the POSCOMP signal and the PMOS device controlled by the POSCOMPN signal. A further NMOS/PMOS switch pair 105 of switch 100 has the NMOS device controlled by the POSCOMP signal and the PMOS device controlled by the POSCOMPN signal.

With this arrangement, when the POSCOMP signal is high, the switch paths provided by NMOS/PMOS pairs 99 and 101 are closed and the switch paths provided by NMOS/PMOS pairs 103 and 105 are open, thereby causing the $V_{TH}$ signal to be provided by the PEAK_MINUS voltage and the $V_{TR}$ tracking signal to be provided by the PEAK_PLUS voltage. Once the POSCOMP signal transitions to a logic low level, the switch paths provided by NMOS/PMOS pairs 99 and 101 are open and the switch paths provided by NMOS/PMOS pairs 103 and 105 are closed, thereby causing the $V_{TH}$ signal to be provided by the PEAK_PLUS voltage and the $V_{TR}$ tracking signal to be provided by the PEAK_MINUS voltage. Thus, when the POSCOMP signal is at a logic high level, the PEAK_MINUS voltage provides the $V_{TH}$ threshold voltage at the inverting input of comparator 64 and the PEAK_PLUS voltage provides $V_{TR}$ tracking voltage at the inverting input of comparator 68. Conversely, when the POSCOMP signal is at a logic low level, the PEAK_PLUS voltage provides the $V_{TH}$ threshold voltage at the inverting input of comparator 64 and the PEAK_MINUS voltage provides the $V_{TR}$ tracking voltage at the inverting input of comparator 68.

Figure 3B:
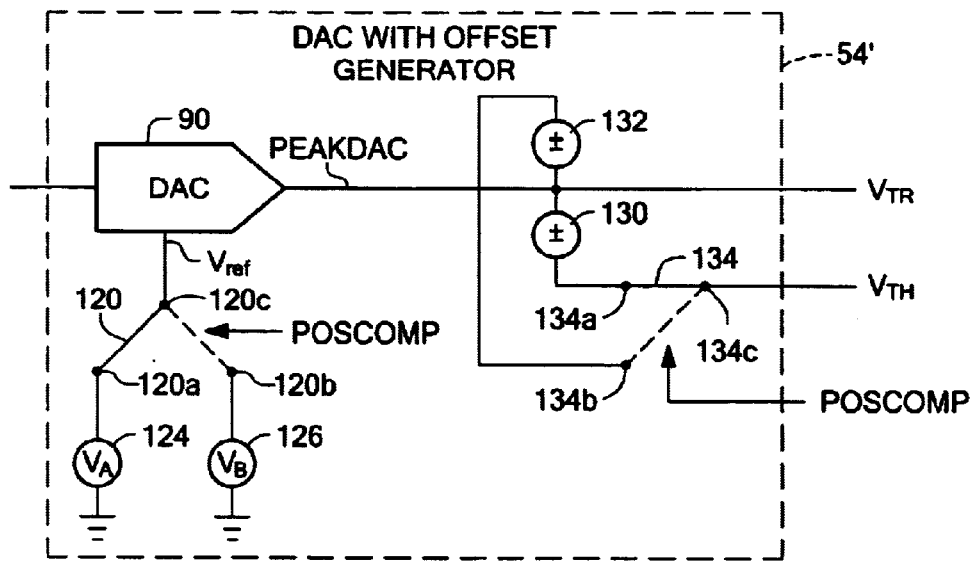
FIG. 3B shows an alternative DAC having an offset generator for use in the Hall effect proximity detector of FIG. 3.

Referring to FIG. 3B, an alternative DAC with offset generator 54' is shown to include DAC 90 which is responsive to a switchable reference voltage Vref. More particularly, the reference voltage input to the DAC 90 is coupled to a terminal 120c of a switch 120 having a second terminal 120a coupled to a voltage source 124 providing a reference voltage $V_A$ and a third terminal 120b coupled to a voltage source 126 providing a reference voltage $V_B$, as shown. The switch 120 is controlled by the POSCOMP signal such that, when the POSCOMP signal is in a first logic state, the reference voltage Vref is provided by the $V_A$ voltage and, when the POSCOMP signal is in a second logic state, the reference voltage Vref is provided by the $V_B$ voltage. In general, the voltages $V_A$ and $V_B$ differ from one another by a predetermined amount. In the illustrative embodiment, $V_A$ is on the order of 100 millivolts greater than $V_B$.

The PEAKDAC output signal of the DAC 90 provides the $V_{TR}$ tracking signal, as shown. The $V_{TH}$ threshold signal differs from the $V_{TR}$ tracking signal by a predetermined offset amount. When the POSCOMP signal is in a first logic state, the $V_{TH}$ threshold signal is greater than the $V_{TR}$ tracking signal by a predetermined amount and when the POSCOMP signal is in the second logic state, the $V_{TH}$ threshold signal is less than the $V_{TR}$ tracking signal by the predetermined amount.

More particularly, the PEAKDAC voltage is coupled to a first terminal of a voltage source 130 and to a first terminal of a voltage source 132. The second terminal of voltage source 130 is coupled to a terminal 134a of a switch 134 and the second terminal of voltage source 132 is coupled to a terminal 134b of switch 134, as shown. A further terminal 134c of switch 134 is coupled to the $V_{TH}$ threshold signal line. Switch 134 operates under the control of the POSCOMP signal.

Figure 6:
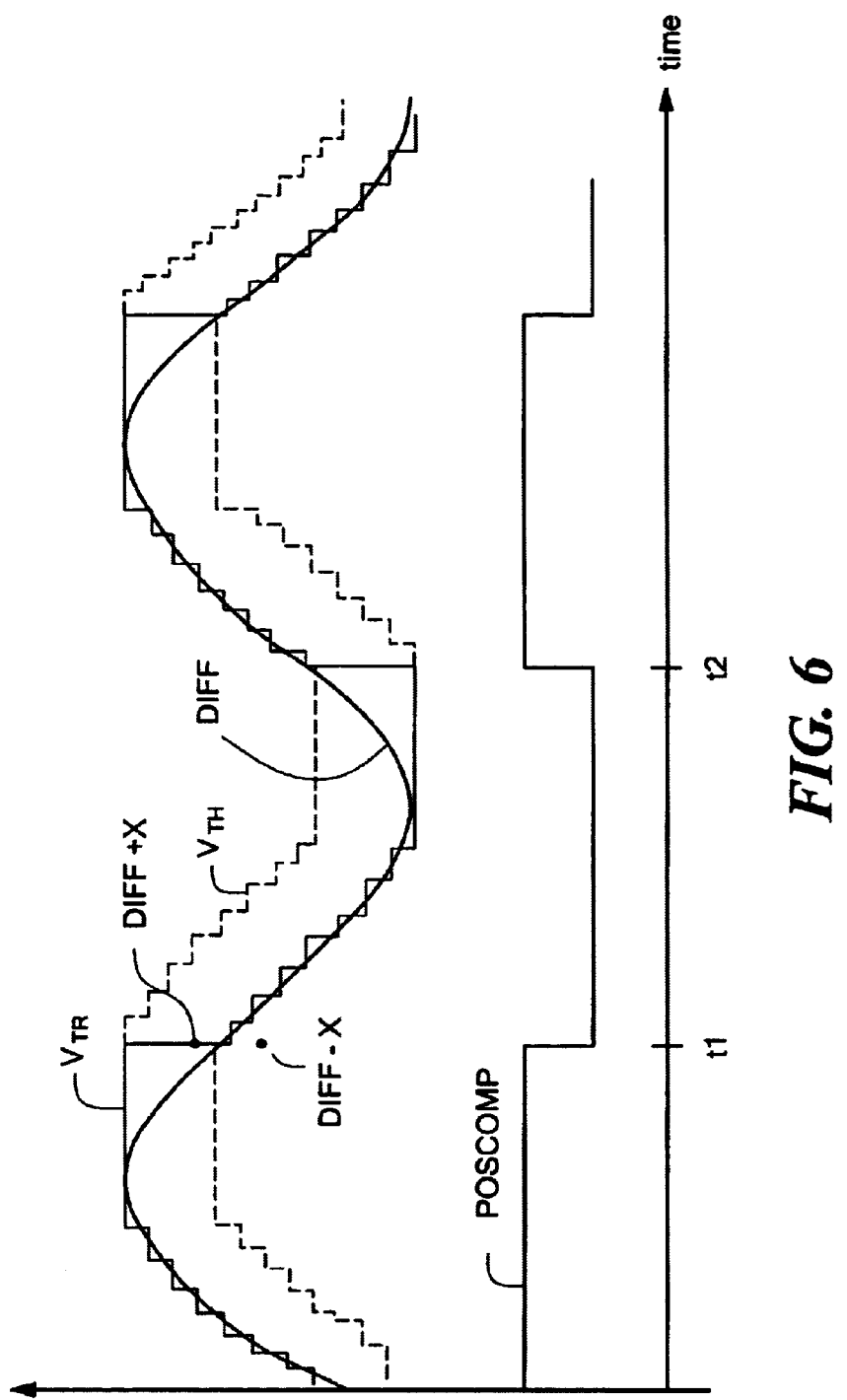
FIG. 6 shows signal waveforms associated with the Hall effect proximity detector of FIGS. 3, 3B, 3C and 3D.

Referring also to FIG. 6, the $V_{TR}$ tracking signal (shown by the solid line) and the $V_{TH}$ threshold signal (shown by the dotted line) generated by the circuit 54' of FIG. 3B are shown in relation to an illustrative DIFF signal. Also shown is the POSCOMP signal. When the POSCOMP signal is at a logic high level, the DAC reference voltage Vref is provided by the higher reference voltage $V_A$. At time ti, when the POSCOMP signal transitions to a logic low level, the switch 120 toggles, causing the DAC reference voltage Vref to be provided by the lower reference voltage $V_B$. Thus, at time t1, the PEAKDAC voltage is pulled down by the difference between the $V_A$ and $V_B$ voltages, here by approximately 100 millivolts. Conversely, at time t2, when the POSCOMP signal next transitions, the switch 120 toggles causing the DAC reference voltage Vref again to be provided by the higher $V_A$ voltage. Thus, at that point, the PEAKDAC voltage is pulled up by the difference between the $V_A$ and $V_B$ voltages. With this arrangement, the PEAKDAC voltage which, in this embodiment, provides the $V_{TR}$ tracking signal is brought to substantially the same level as the DIFF signal in response to transitions of the POSCOMP signal.

The selection of the difference between the $V_A$ and $V_B$ voltages is based on how much the DIFF signal has to vary from its preceding peak or valley to cause a transition in the POSCOMP signal. That is, the POSCOMP signal transitions when the DIFF signal varies from the preceding peak or valley by a predetermined voltage which is established by offset voltage source 130. For example, in the illustrative embodiment, the $V_{TH}$ threshold signal is offset by approximately 100 millivolts with respect to the $V_{TR}$ tracking signal. Therefore, the POSCOMP signal transitions when the DIFF signal varies from the preceding peak or valley by 100 millivolts. The difference between the $V_A$ and $V_B$ voltages is selected to be the same as the voltage of sources 130 and 132, here 100 millivolts. By pulling the PEAKDAC voltage down by 100 millivolts upon negative-going transitions of the POSCOMP signal and pulling the PEAKDAC voltage up by 100 millivolts upon positive-going transitions of the POSCOMP signal, the $V_{TR}$ tracking signal which is provided by the PEAKDAC voltage is forced to substantially the same level as the DIFF signal. As will be described below, bringing the $V_{TR}$ tracking signal to substantially the same level as the DIFF signal in response to output signal transitions is one way to force the two signals towards each other. As an alternative, the $V_{TR}$ tracking signal may be forced to some fixed offset from the DIFF signal, such as to a level of DIFF+X or DIFF−X upon output signal transitions.

Figure 3C:
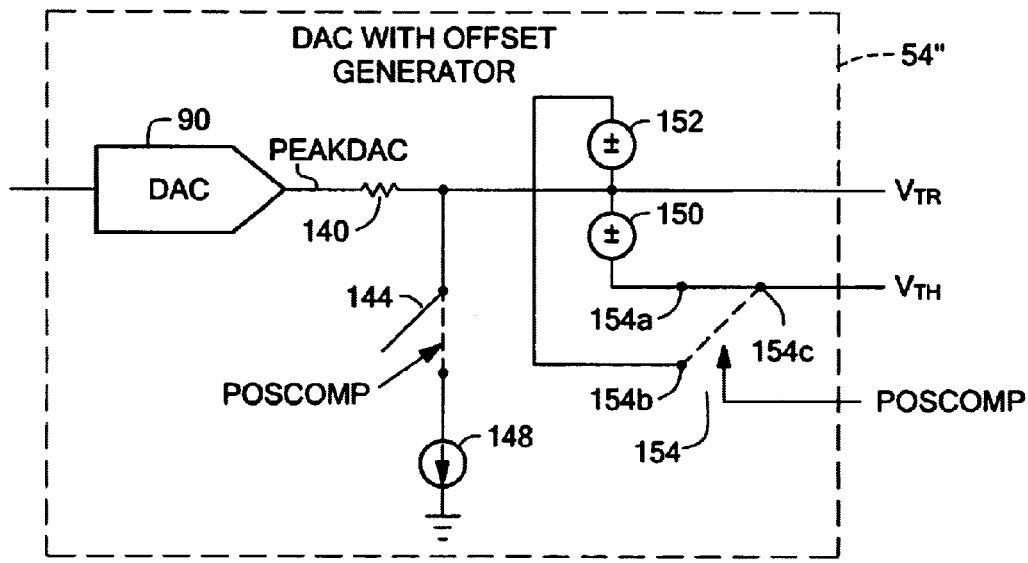
FIG. 3C shows another alternative DAC having an offset generator for use in the Hall effect proximity detector of FIG. 3.

Referring also to FIG. 3C, a further alternative DAC with offset generator 54" includes the DAC 90 providing the PEAKDAC voltage. The DAC output is coupled to a first terminal of a resistor 140, the second terminal of which provides the $V_{TR}$ tracking signal. The second terminal of the resistor 140 is further coupled to a switch 144 which, under the control of the POSCOMP signal, is either open (as shown by the solid line) or is closed (as shown by the dotted line) to couple the resistor 140 to a current source 148.

The $V_{TH}$ threshold signal is generated by voltage sources 150, 152 and switch 154, coupled and operative as described above in conjunction with substantially identical elements 130, 132, and 134 of FIG. 3B. Thus, the $V_{TH}$ threshold signal differs from the $V_{TR}$ tracking signal by a predetermined offset amount, such that when the POSCOMP signal is in a first logic state, the $V_{TH}$ threshold signal is greater than the $V_{TR}$ tracking signal by the amount of voltage source 152 and when the POSCOMP signal is in the second logic state, the $V_{TH}$ threshold signal is less than the $V_{TR}$ tracking signal by the amount of voltage source 150.

The $V_{TR}$ tracking signal and $V_{TH}$ threshold signal generated by the circuit 54" of FIG. 3C are substantially identical to like signals generated by the circuit 54' of FIG. 3B. Thus, FIG. 6 shows the $V_{TR}$ tracking signal (shown by the solid line) and the $V_{TH}$ threshold signal (shown by the dotted line) generated by the circuit 54" of FIG. 3C in relation to an illustrative DIFF signal and the POSCOMP signal.

When the POSCOMP signal is high, the switch 144 is open. Thus, no voltage is dropped across resistor 140, resulting in the PEAKDAC voltage providing the $V_{TR}$ tracking signal. At time t1, when the POSCOMP signal transitions to a logic low level, switch 144 closes, causing a predetermined current to be drawn from the DAC output, thereby causing a predetermined voltage drop across the resistor 140, here on the order of 100 millivolts. Thus, at time t1, the $V_{TR}$ tracking signal is pulled down by approximately 100 millivolts. Switch 144 remains closed until to time t2, when the POSCOMP signal next transitions. At time t2, the switch 144 opens, thereby removing the voltage drop across resistor 140 and again causing the $V_{TR}$ tracking signal to be provided by the PEAKDAC voltage.

Figure 3D:
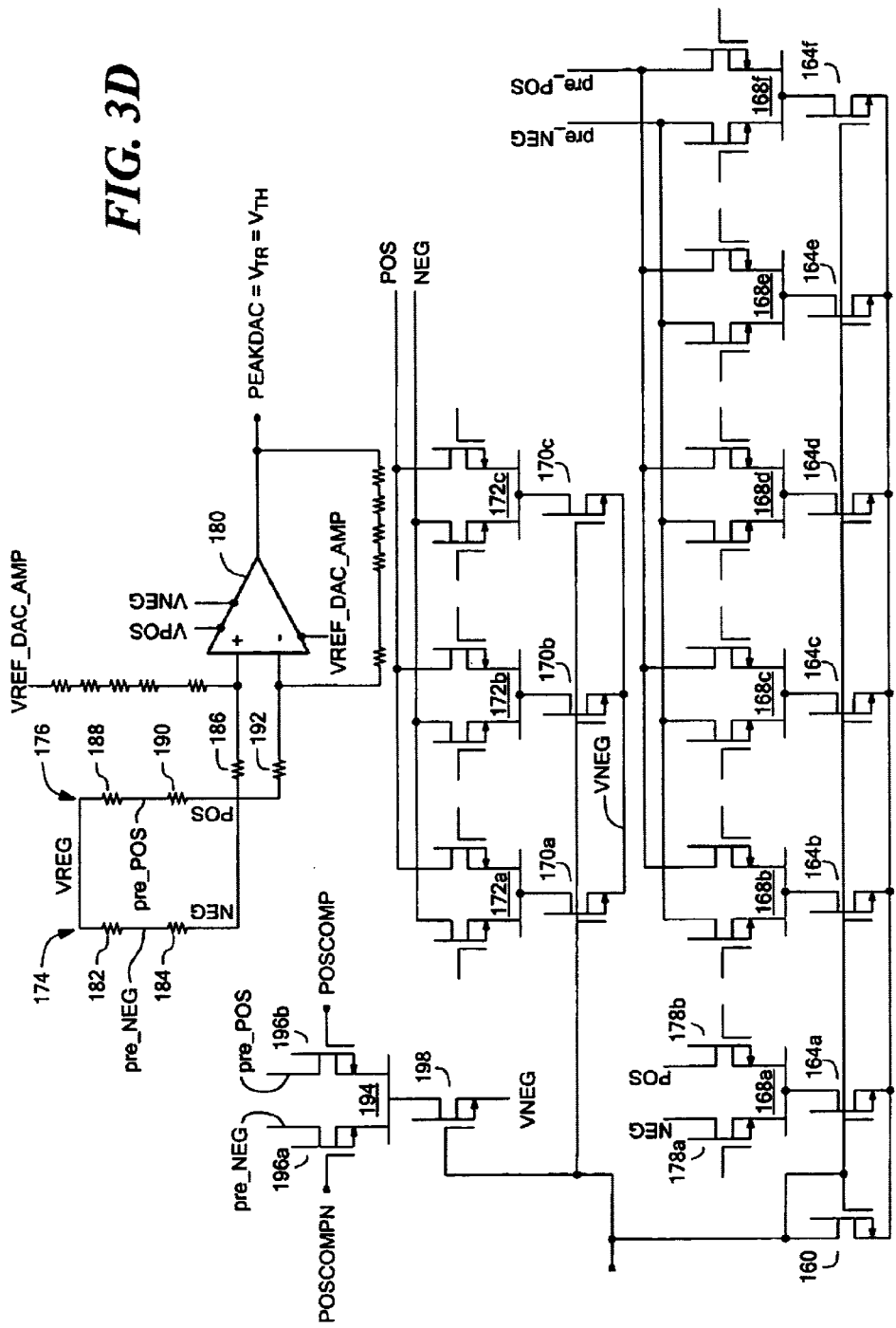
FIG. 3D shows a still further alternative DAC having an offset generator for use in the Hall effect proximity detector of FIG. 3.

Referring also to FIG. 3D, a still further alternative embodiment of the DAC with offset generator 54''' is shown. The circuit 54''' provides the offset generator functionality integral to the DAC. The circuit 54''' is a binary weighted, current switched DAC including a current mirror 160 providing a plurality of current sources 164a–164f, each coupled to a pair of switches 168a–168f, respectively. Additional current sources 170a–170c are coupled to respective switch pairs 172a–172c, as shown. Each of the current sources 164a–164f corresponds to one DAC bit, with current source 164f being the least significant bit (LSB). Thus, each switch pair is controlled by respective bits of counter 78 (FIG. 3). Current sources 170a–170c implement a thermometer code technique by which additional binary weighting is achieved.

Each pair of switches 168a–168f and 172a–172c includes a first NMOS switch coupled to a node of a first resistor string 174 and a second NMOS switch coupled to a node of a second resistor string 176. For example, exemplary switch pair 168a includes a first NMOS switch 178a coupled to node INEG of resistor string 174 and further includes a second NMOS switch 178b coupled to a node IPOS of resistor string 176.

A negative feedback operational amplifier 180 has a non-inverting input coupled to resistor string 174 and an inverting input coupled to resistor string 176, as shown. Resistor string 174 includes resistors 182, 184, and 186, with node pre_INEG disposed between resistors 182 and 184 and node INEG disposed between resistors 184 and 186. Resistor string 176 includes resistors 188, 190, and 192, with node pre_IPOS disposed between resistors 188 and 190 and node IPOS disposed between resistors 190 and 192, as shown.

The DAC with integral offset generator 54''' further includes an additional switched current source 198 coupled to a pair of NMOS switches 194. More particularly, a first switch 196a of the pair 194 has a gate terminal controlled by the POSCOMPN signal (as is generated by an inverter responsive to the POSCOMP signal) and a drain terminal coupled to the pre_INEG node of resistor string 174. Switch 196b of switch pair 194 has a gate terminal controlled by the POSCOMP signal (FIG. 3) and a drain terminal coupled to the pre_IPOS node of resistor string 176. The switched current source 198 in combination with switch pair 194 introduces an offset to the PEAKDAC voltage, as will be described. Suffice it to say here that when the POSCOMP signal is in a first logic state, the PEAKDAC voltage is pulled down by a predetermined amount and when the POSCOMP signal is in the second, opposite logic state, the PEAKDAC signal is pulled up by the predetermined offset amount. Here, the offset voltage introduced to the PEAKDAC signal is determined by the predetermined amount away from the DIFF signal peaks and valleys at which the POSCOMP signal transitions, here on the order 100 millivolts.

In operation, the voltage at the inputs of operational amplifier 180 are determined by which of the switch pairs 168a–168f, 172a–172c, and 194 are conducting. The conducting switches, in turn, dictate the amount of current pulled through the respective node of the resistor strings 174, 176. Further, depending on which of switches 196a and 196b is conducting, an additional voltage drop is introduced into one of the resistor strings 174, 176 so as to cause the PEAKDAC voltage to be increased or decreased by the predetermined amount dictated by current source 198.

In the DAC with offset generator 54''', the $V_{TR}$ tracking signal and the $V_{TH}$ threshold signal are both provided by the PEAKDAC voltage. That is, comparator 68 has internal hysteresis which ensures that the POSCOMP signal changes state only when the DIFF signal varies from the $V_{TR}$ tracking signal by a predetermined amount, such as 100 mV.

Figure 7:
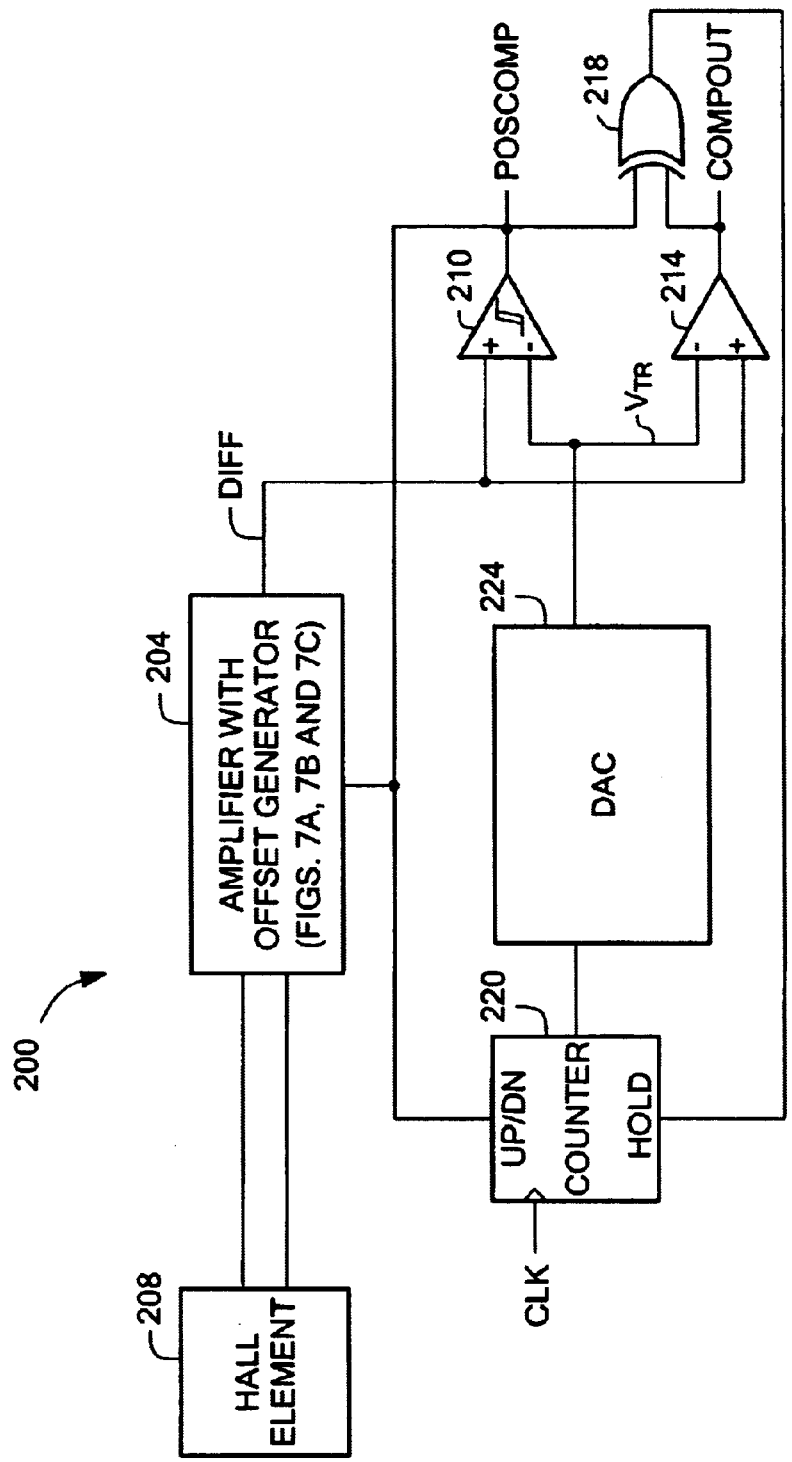
FIG. 7 is a block diagram of a Hall effect proximity detector including a signal amplifier having an offset generator according to an alternative embodiment of the invention.

Referring also to FIG. 7, an alternate embodiment of the proximity detector of FIG. 3 is shown in which the offset generator mechanism for bringing the $V_{TR}$ tracking signal and the DIFF signal together upon transitions of the POSCOMP signal is combined with the magnetic field signal amplifier. Thus, the proximity detector 200 includes a combination amplifier with offset generator circuit 204 which is responsive to the magnetic field proportional signal from a Hall device 208 and which generates the DIFF signal, as shown.

The proximity detector 200 further includes a comparator 210 which, like comparator 68 of FIG. 3 is responsive to the DIFF signal and to the $V_{TR}$ tracking signal, for generating the POSCOMP output signal which changes state when the DIFF signal varies from the preceding peak or valley by a predetermined amount. In the embodiment of FIG. 7, this predetermined amount is established by the hysteresis of comparator 210. Alternatively however, it will be appreciated by those of ordinary skill in the art that this predetermined amount may be established internal to the DAC 224, by generating a separate $V_{TH}$ threshold signal for coupling to the comparator 210, which $V_{TH}$ threshold signal varies from the $V_{TR}$ tracking signal by the predetermined amount.

The DIFF signal and the $V_{TR}$ tracking signal are further coupled to a second comparator 214 which provides the COMPOUT signal which transitions when the DIFF signal crosses the $V_{TR}$ tracking signal. The POSCOMP signal and the COMPOUT signal are coupled to an XOR gate 218, like gate 74 of FIG. 3, which generates the HOLD input for a counter 220, as shown. The counter 220 is further responsive to a clock signal, CLK, and to the POSCOMP signal for controlling the count direction. The output of the counter 220 is coupled to the DAC 224, as shown, which provides at its output the PEAKDAC signal, which here serves as the $V_{TR}$ tracking signal.

Figure 8:
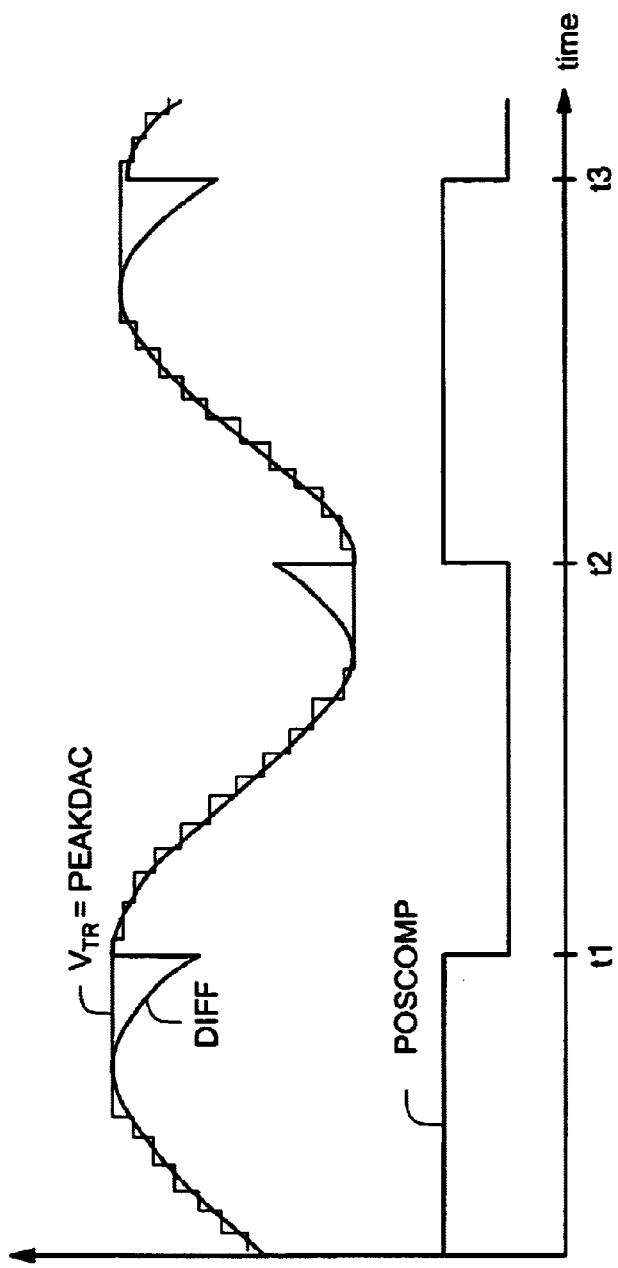
FIG. 8 shows signal waveforms associated with the Hall effect proximity detector of FIGS. 7, 7A and 7B.

The operation of the proximity detector 200 will be described in connection with the illustrative DIFF signal waveform of FIG. 8. Also shown in FIG. 8 are the PEAKDAC signal (which provides the $V_{TR}$ tracking signal) and the POSCOMP signal. As is apparent, when the POSCOMP signal is at a first logic level, here high, the PEAKDAC signal tracks the DIFF signal and holds the DIFF signal peak, as shown. Once the DIFF signal falls away from the preceding peak by the predetermined amount, as occurs at time t1, the POSCOMP signal transitions, here to a logic low level. Upon the POSCOMP signal transition at time t1, an offset is introduced into the DIFF signal in order to bring the DIFF signal up to substantially the same level as the $V_{TR}$ tracking signal, as shown. At the next transition of the POSCOMP signal, as occurs at time t3, the DIFF signal is brought down by an offset amount in order to once again bring the DIFF signal to the level of the $V_{TR}$ tracking signal. In this way, the two signals, the DIFF signal and the $V_{TR}$ tracking signal, are brought to the same level upon transitions of the POSCOMP signal. However, whereas this functionality is achieved in the embodiment of FIG. 3 by manipulating the $V_{TR}$ tracking signal level, in the embodiment of FIG. 7, this is achieved by manipulating the DIFF signal level.

Figure 7A:
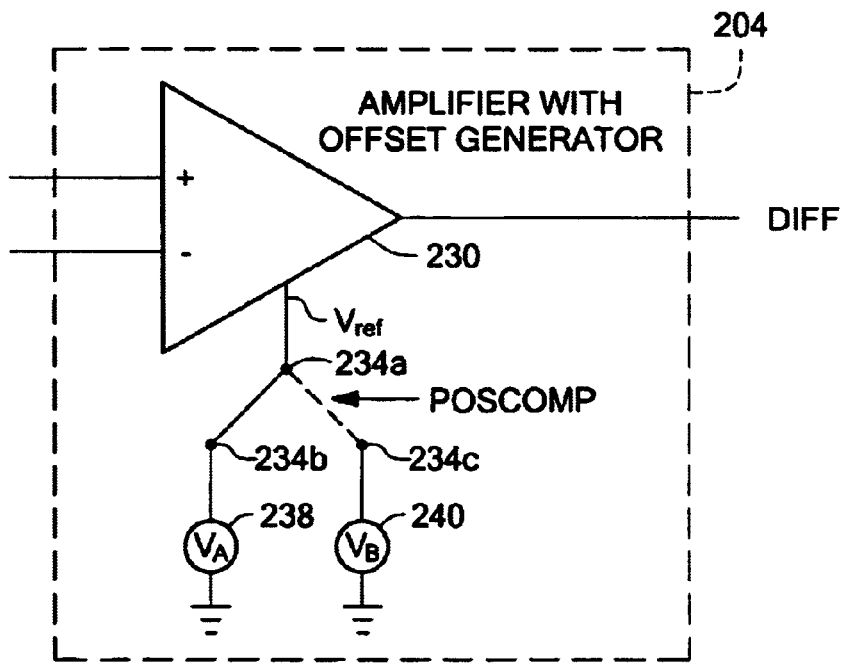
FIG. 7A shows one illustrative signal amplifier having an offset generator for use in the Hall effect proximity detector of FIG. 7.

Referring also to FIG. 7A, an illustrative amplifier with offset generator 204 for use in the proximity detector 200 of FIG. 7 is shown. The circuit 204 includes an amplifier 230 responsive to a reference voltage Vref, as shown. The reference voltage terminal of the amplifier is coupled to a switch 234 having a first terminal 234a coupled to the reference voltage input of the amplifier 230, a second terminal 234b coupled to a voltage source 238 providing a voltage $V_A$, and a third terminal 234c coupled to a voltage source 240 providing a voltage $V_B$, as shown. The voltage levels $V_A$ and $V_B$ differ from each other by a predetermined amount. For example, in one illustrative embodiment, the $V_A$ voltage is 100 mV greater than the $V_B$ voltage.

In operation, switch 234 is controlled by the POSCOMP signal such that when the POSCOMP signal is in a first logic state, for example at a logic high level, the switch is positioned to couple the lower $V_B$ voltage to the Vref reference terminal of the amplifier. When the POSCOMP signal transitions at time t1, the switch toggles to couple the higher $V_A$ voltage to the reference terminal of the amplifier. In this way, the DIFF signal is pulled up by the amount of the difference between the $V_A$ and $V_B$ voltages. When the POSCOMP signal transitions back to the first logic state, such as at time t2, the switch 234 toggles to couple the lower $V_B$ voltage to the reference terminal of the amplifier, thereby pulling the DIFF signal down by the 100 mV difference between the $V_A$ and $V_B$ voltages.

Figure 7B:
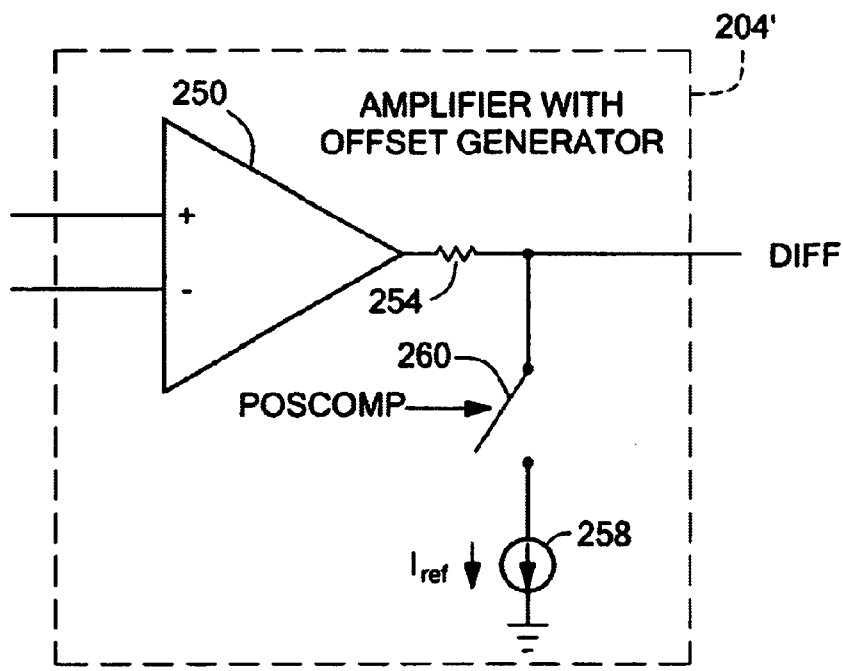
FIG. 7B shows an alternative signal amplifier having an offset generator for use in the Hall effect proximity detector of FIG. 7.

An alternative amplifier with offset-generator 204' is shown in FIG. 7B to include an amplifier 250 with its output coupled to a first terminal of a series resistor 254. The second terminal of resistor 254 is coupled to a current source 258 through a switch 260, as shown. The DIFF signal is provided at the second terminal of the resistor 254. The current $I_{REF}$ and the value of resistor 254 are selected to achieve the desired offset voltage, such as 100 mV.

In operation, when the POSCOMP signal is in a first logic state, for example at a logic high level, the switch 260 is closed, causing the $I_{REF}$ current to be drawn through the resistor 254, thereby causing a voltage drop across the resistor and pulling the DIFF signal down by the amount of the voltage drop. When the POSCOMP signal transitions, such as at time t1, to the second logic state, the switch 260 opens, thereby eliminating the voltage drop across resistor 254 and causing the DIFF signal to rise by the amount of the voltage drop.

Figure 7C:
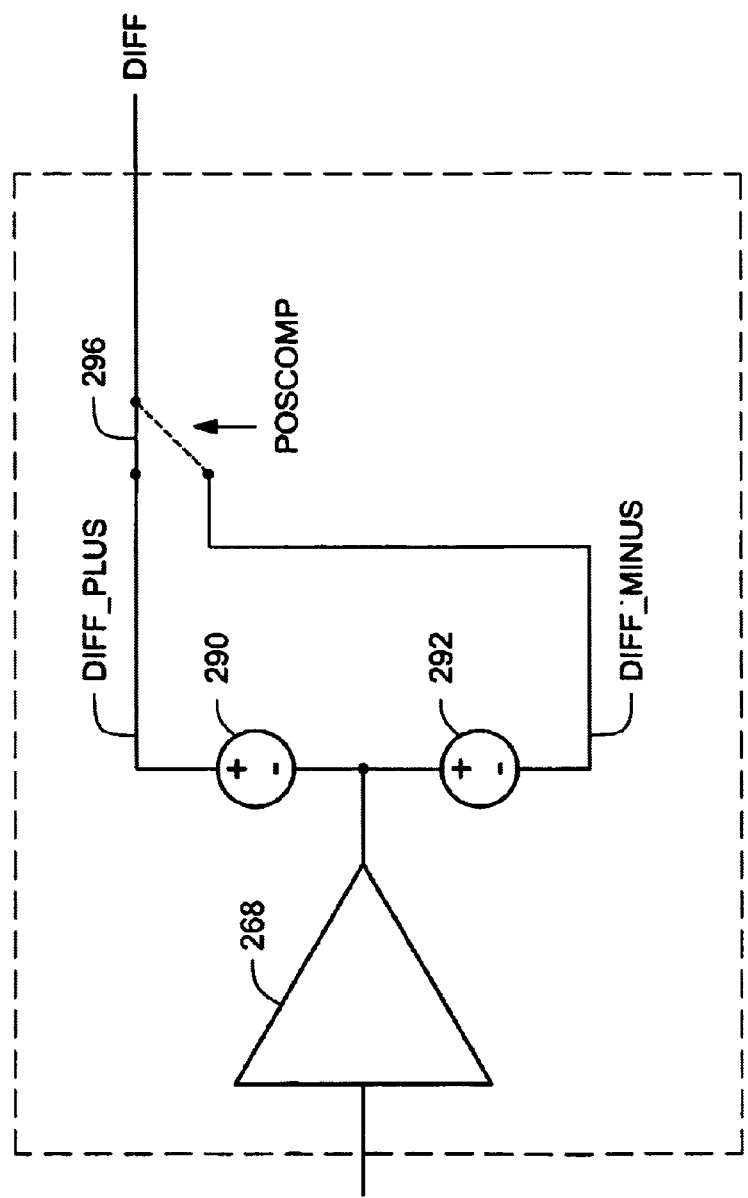
FIG. 7C shows another alternative signal amplifier having an offset generator for use in the Hall effect proximity detector of FIG. 7.

Referring also to FIG. 7C, a further alternative amplifier with offset generator 204" is shown to include amplifier 268 which generates an amplified output signal coupled to a pair of offset voltage sources 290, 292. The voltage source 290 generates a DIFF_PLUS voltage at a predetermined offset voltage greater than the amplifier output and the voltage source 292 generates a DIFF_MINUS voltage at the predetermined offset voltage less than the amplifier output signal. In the illustrative embodiment, each of the voltage sources 290, 292 is substantially identical and introduces an offset voltage on the order of 50 millivolts.

The DIFF_PLUS and DIFF_MINUS voltages are coupled to a switch 296 which is controlled by the POSCOMP signal, as shown. In operation, when the POSCOMP signal is in a first logic state, the switch 296 is in a first position (shown by the solid line) so as to couple the DIFF_PLUS voltage to the DIFF signal line and when the POSCOMP signal is in the second logic state, the switch 296 is in a second position (shown by the dotted line) so as to couple the DIFF_MINUS voltage to the DIFF signal line.

Figure 9:
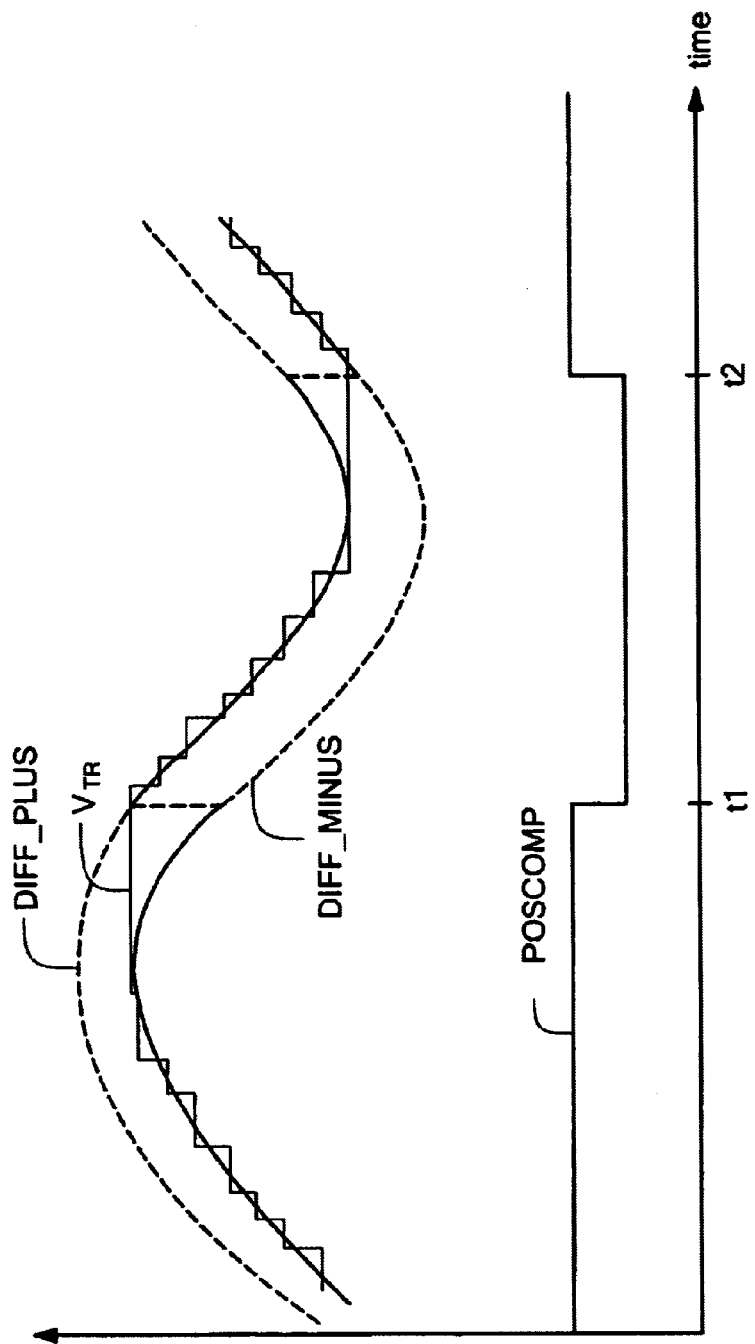
FIG. 9 shows signal waveforms associated with the Hall effect proximity detector of FIGS. 7 and 7C.

Referring also to the illustrative waveforms of FIG. 9, it will be apparent that when the POSCOMP signal is in a logic high state, the DIFF signal (shown by the dotted line) is provided by the DIFF_MINUS voltage; whereas, when the POSCOMP signal transitions to a logic low level at time t1, the switch 296 changes position causing the DIFF signal to be provided by the DIFF_PLUS voltage. In this way, the DIFF signal is brought to substantially the same level as the $V_{TR}$ tracking signal upon changes in state of the POSCOMP output signal.

Figure 10:
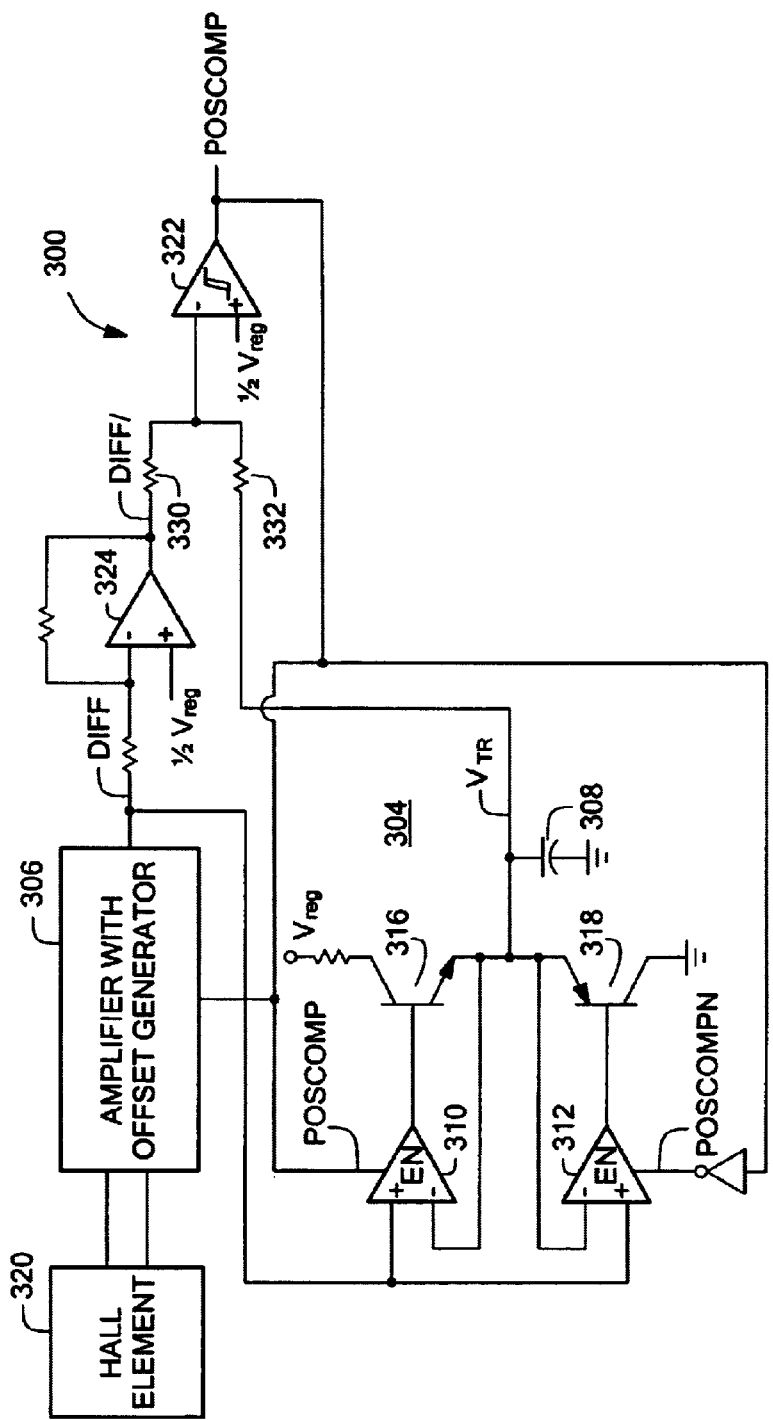
FIG. 10 is a block diagram of a Hall effect proximity detector including an analog peak detector and a signal amplifier having an offset generator in accordance with a further embodiment of the invention.

Referring to FIG. 10, an alternative Hall effect proximity detector 300 includes an analog peak detector 304 and an amplifier with offset generator 306. The analog peak detector 304 comprises a capacitor 308 which is charged and discharged by operational amplifiers 310, 312 through respective transistors 316, 318, so that the voltage across the capacitor closely tracks the DIFF signal. The voltage across the capacitor 308 provides the $V_{TR}$ tracking signal. More particularly, each of the operational amplifiers 310, 312 receives the DIFF signal and is enabled by a respective one of the POSCOMPN and POSCOMP signals, as shown. With this arrangement, amplifier 310 is enabled when the POSCOMP signal is high and the DIFF signal is rising. When the DIFF signal exceeds the $V_{TR}$ tracking signal, transistor 316 is on and the capacitor 308 is charged. Once the DIFF signal reaches a positive peak, the transistor 316 is off and the $V_{TR}$ tracking signal is held. Similarly, amplifier 312 is enabled when the POSCOMPN signal is high and the DIFF signal is falling. When the DIFF signal falls below the $V_{TR}$ tracking signal, transistor 318 is on causing the capacitor 308 to be discharged. Once the DIFF signal reaches a negative peak, the transistor 318 is off and the $V_{TR}$ tracking signal is held. Additional possible features of the analog peak detector 304, such as current sources for compensating for leakage current from the capacitor 308, are described in a U.S. Pat. No. 5,442,283, entitled HALL-VOLTAGE SLOPE-ACTIVATED SENSOR, assigned to the assignee of the present invention and hereby incorporated herein by reference.

The amplifier with offset generator circuit 306 is responsive to the magnetic field proportional signal from a Hall device 320 for generating the DIFF signal and is substantially identical to like circuit 204 of FIG. 7. In the embodiment of FIG. 7, an inverted version of the DIFF signal, DIFF/, is generated and summed to the $V_{TR}$ tracking signal in order to for coupling to a comparator 322. More particularly, an inverting amplifier 324 referenced to 1/2Vreg receives the DIFF signal and generates the DIFF/ signal which is 180° out-of-phase with respect to the DIFF signal. Resistors 330, 332 provide a summing node at the inverting input to comparator 322 at which the DIFF/ signal and the $V_{TR}$ tracking signal are summed. The non-inverting input of the comparator 322 receives a reference voltage, here of 1/2Vreg. With this arrangement, the POSCOMP signal changes state when the sum of the DIFF/ signal and the $V_{TR}$ tracking signal varies from 1/2Vreg by more than a predetermined amount. Stated differently, the POSCOMP signal changes state when the DIFF signal varies from the $V_{TR}$ tracking signal by the predetermined amount.

Figure 11:
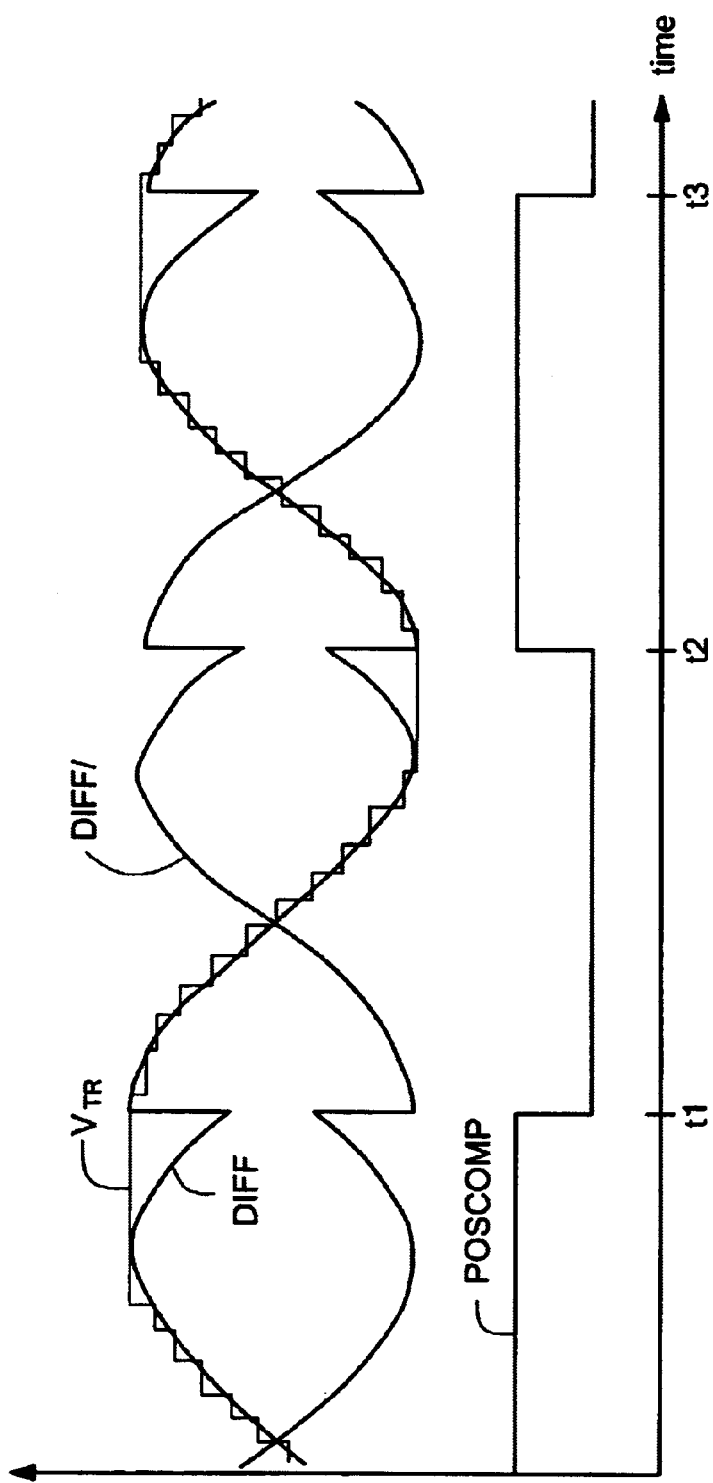
FIG. 11 shows signal waveforms associated with the Hall effect proximity detector of FIG. 10.

The operation of the proximity detector 300 will be described in connection with the illustrative DIFF and DIFF/ signal waveforms of FIG. 11. Also shown in FIG. 11 are the $V_{TR}$ tracking signal and the POSCOMP signal. When the POSCOMP signal is at a first positive peak, as shown. Once the DIFF signal falls away from the preceding peak by the predetermined amount, as occurs at time t1, the POSCOMP signal transitions, here to a logic low level. Upon the POSCOMP signal transition at time t1, an offset is introduced into the DIFF signal, and thus also to the DIFF/ signal by the amplifier with offset generator 306, in order to bring the DIFF signal up to substantially the same level as the $V_{TR}$ tracking signal, as shown. At the next transition of the POSCOMP signal, as occurs at time t2, the DIFF signal is brought down by the offset amount in order to once again bring the DIFF signal towards the level of the $V_{TR}$ tracking signal. In this way, the two signals, the DIFF signal and the $V_{TR}$ tracking signal, are brought to substantially the same level upon transitions of the POSCOMP signal. It will be appreciated by those of ordinary skill in the art that either of the amplifier with offset generator embodiments shown in FIGS. 7A and 7B could be used to provide the circuit 306 of FIG. 7.

Figure 12:
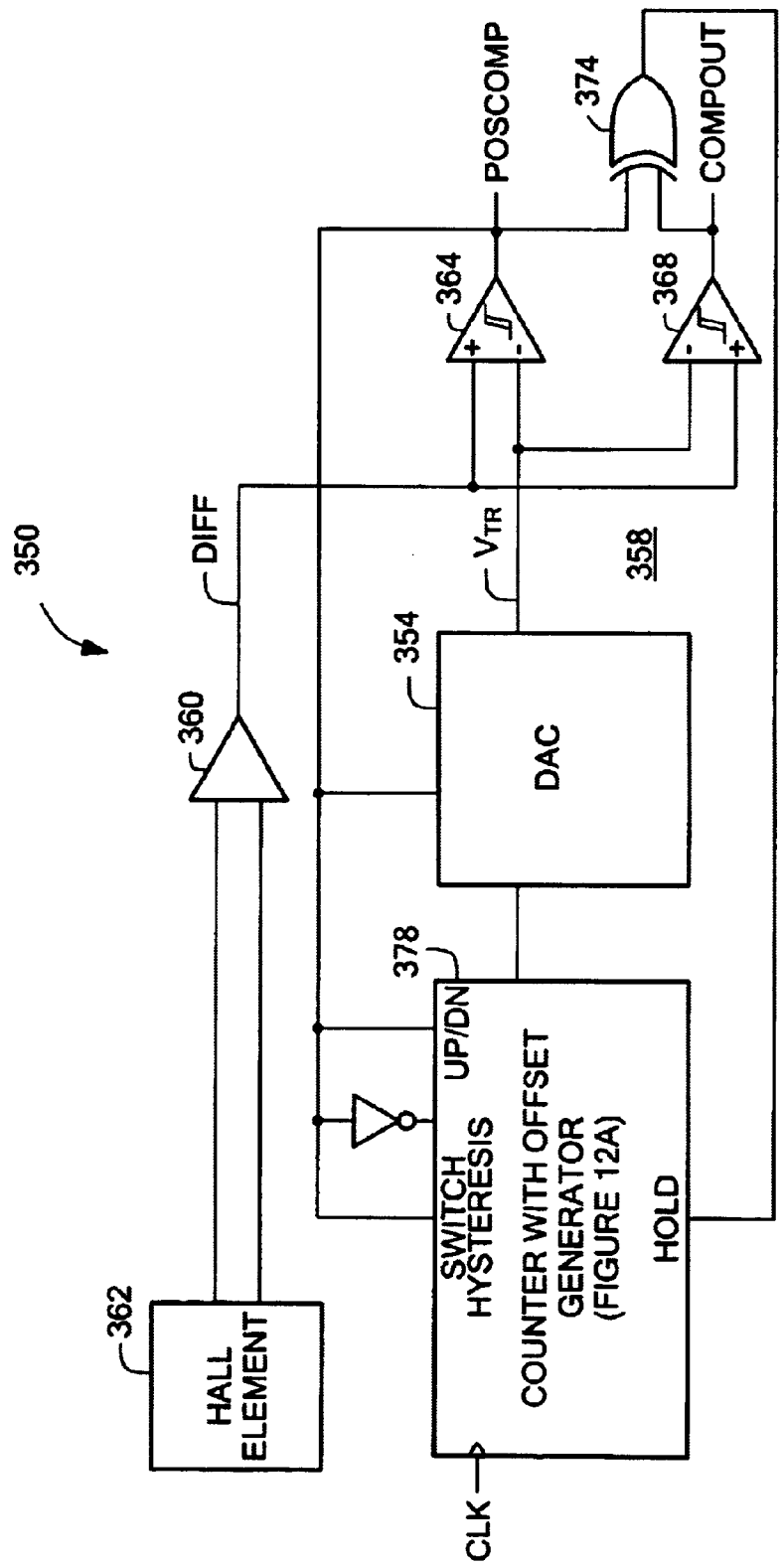
FIG. 12 is a block diagram of a Hall effect proximity detector including a counter having an offset generator according to another alternative embodiment of the invention.

Referring also to FIG. 12, a further alternative proximity detector 350 includes a counter with offset generator for causing the $V_{TR}$ tracking signal to move towards the DIFF signal upon transitions of the POSCOMP output signal. Much of the circuitry of the proximity detector 350 is like that of the proximity detector 50 of FIG. 3. For example, the proximity detector 350 includes an amplifier 360, Hall element 362, comparators 364, 368, and XOR gate 374, all like respective components 60, 62, 64, 68, and 74 of FIG. 3. The peak detector 358 of proximity detector 350 differs from peak detector 58 of the proximity detector 50 of FIG. 3 in that the former includes a DAC 354 which does not have an integral offset generator. Rather, the offset generator functionality is provided in the counter 378. Additionally, the output of the DAC 354 provides the $V_{TR}$ tracking signal for coupling to both of comparators 364 and 368 and the predetermined difference between the DIFF signal and the $V_{TR}$ tracking signal necessary to cause a transition of the POSCOMP signal is established by the hysteresis of comparator 364.

Figure 12A:
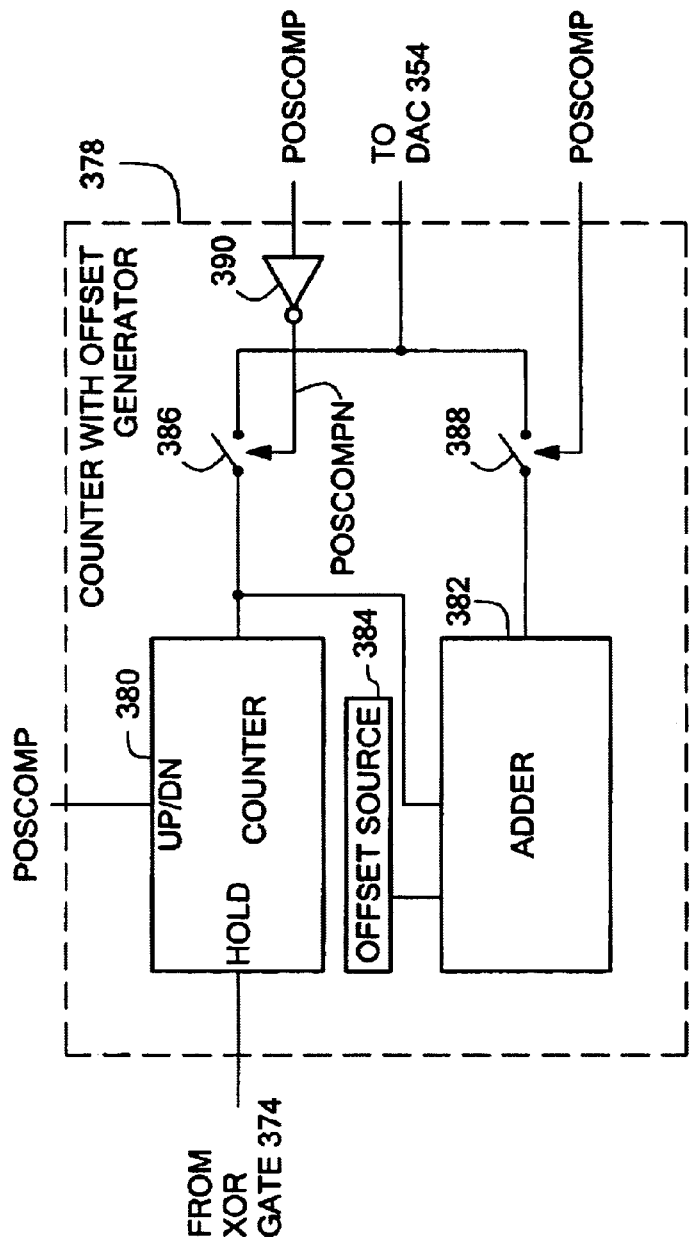
FIG. 12A shows an illustrative counter having an offset generator for use in the Hall effect proximity detector of FIG. 12.

Referring also to FIG. 12A, an illustrative counter with offset generator 378 is shown to include a counter 380, an adder 382, and an offset source 384. The counter 380 is responsive to the POSCOMP signal which controls the direction of the count and also to the output of XOR gate 374 which controls the HOLD input to the counter. The output of the counter is fed back to the adder 382. The adder 382 is further responsive to the offset source 384 which provides a signal indicative of the predetermined amount by which the $V_{TR}$ tracking signal is moved towards the DIFF signal upon transitions of the POSCOMP output signal. In the illustrative embodiment, in which the $V_{TR}$ tracking signal is forced to a level substantially equal to the DIFF signal, the predetermined amount is equal to the hysteresis of comparator 364, such as 100 millivolts. With this arrangement, the adder 382 provides an output signal equal to the value of the counter output plus the value of the predetermined offset amount, or the hysteresis value.

The output of each of the counter 380 and the adder 382 is coupled to a respective switch 386, 388, which switches are further coupled to the DAC 354, as shown. Switch 386 is controlled by the POSCOMPN signal which is generated by an inverter 390 and switch 388 is controlled by the POSCOMP signal. When the POSCOMP signal is low, switch 386 is closed and the DAC 354 receives the output signal from the counter 380 and when the POSCOMP signal is high, the DAC 354 receives the output signal from the adder 382.

The operation of the counter with offset generator 350 will be described in conjunction with the illustrative waveforms of FIG. 6. The $V_{TH}$ threshold signal shown in FIG. 6 is not applicable to the proximity detector of FIG. 12 since the predetermined amount by which the DIFF signal must differ from the $V_{TR}$ tracking signal in order to cause a change of state in the POSCOMP signal is established by the hysteresis of comparator 364 as mentioned above. When the POSCOMP signal goes low, such as at time t1, switch 386 is closed and the DAC 354 receives at its input the output of counter 380. This causes the $V_{TR}$ tracking signal to track the falling DIFF signal and to hold the valley of the DIFF signal occurring between times t1 and t2. Once the POSCOMP signal goes high, at time t2, switch 388 is closed and the DAC 354 receives the output of the adder 382 which is equal to the count value of counter 380 plus the offset amount as introduced by the offset source 384. The addition of the offset to the counter output causes the $V_{TR}$ tracking signal to be increased by the offset amount, here to approximately the same level as the DIFF signal, as shown.

As will now be apparent, there are various ways of forcing at least one of the $V_{TR}$ tracking signal and the DIFF signal towards the other of the two signals in response to transitions in the POSCOMP output signal. For example, in the embodiments of FIGS. 3 and 12, the $V_{TR}$ tracking signal is forced towards the DIFF signal and in the embodiments of FIGS. 7 and 10, the DIFF signal is forced towards the $V_{TR}$ tracking signal. It will be appreciated by those of ordinary skill in the art, that both the $V_{TR}$ tracking signal and the DIFF signal may be forced towards each other.

Further, the forced signal may be brought to substantially the same level as the other of the $V_{TR}$ tracking signal and the DIFF signal. For example, in the case of the proximity detector of FIG. 3 containing the DAC with offset generator 54 of FIG. 3A, the $V_{TR}$ tracking signal is brought to substantially the same level as the DIFF signal. This operation is inherent in the proximity detector of FIGS. 3 and 3A since the $V_{TR}$ tracking signal is interchanged with the $V_{TH}$ threshold signal and thus, is brought to substantially the same level as the DIFF signal. However, this need not be the case when using the DAC with offset generator embodiments 54', 54", and 54'" of FIGS. 3B, 3C, and 3D, respectively, in conjunction with the proximity detector of FIG. 3 or when using the counter with offset generator 378 of FIGS. 12 and 12A. Rather, it is possible to force the $V_{TR}$ tracking signal to some fixed offset level with respect to the DIFF signal. Considering the illustrative waveforms of FIG. 6 for example, as the output signal transitions at time t1, the $V_{TR}$ tracking signal may be brought to a level through which the DIFF signal already passed, such as DIFF+X. Alternatively, the $V_{TR}$ tracking signal may be brought to a level beyond, or ahead of, the level of the DIFF signal, such as DIFF-X. These alternatives may be achieved simply by varying the amount of the offset introduced by the DAC with offset generator in the case of FIG. 3 or by the counter with offset generator in the case of FIG. 12. The same alternatives apply equally to the embodiments in which the forced signal is the DIFF signal, such as is shown in FIGS. 7 and 10. In other words, the DIFF signal may be forced to substantially the same level as the $V_{TR}$ tracking signal or alternatively, may be forced to some fixed offset level with respect to the $V_{TR}$ tracking signal.

Having described the preferred embodiments of the invention, it will now become apparent to one of ordinary skill in the art that other embodiments incorporating their concepts may be used. For example, it will be appreciated by those of ordinary skill in the art that while several different circuits are described for introducing an offset voltage to the DIFF signal and to the $V_{TR}$ tracking signal for the purpose of bringing these signal levels towards each other at transitions of the POSCOMP signal, other circuits are possible for achieving this function. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A proximity detector comprising:
   a magnetic field-to-voltage transducer providing a magnetic field signal indicative of an ambient magnetic field;
   a peak detector responsive to said magnetic field signal for providing a tracking signal which substantially follows at least a portion of said magnetic field signal; and
   a comparator for providing an output signal which changes state when said magnetic field signal varies from said tracking signal by a predetermined amount, wherein at least one of said tracking signal and said magnetic field signal is forced towards the other one of said tracking signal and said magnetic field signal in response to changes in state of said output signal.

2. The proximity detector of claim 1 wherein said comparator is responsive to a threshold signal that differs from said tracking signal by a predetermined amount.

3. The proximity detector of claim 2 wherein said threshold signal and said tracking signal are interchanged in response to changes in state of said comparator output signal.

4. The proximity detector of claim 1 wherein said comparator is responsive to said tracking signal and has hysteresis by which said predetermined amount is established.

5. The proximity detector of claim 1 wherein said tracking signal is brought to substantially the same level as said magnetic field signal in response to changes in state of said comparator output signal.

6. The proximity detector of claim 1 wherein said magnetic field signal is brought to substantially the same level as said tracking signal in response to changes in state of said comparator output signal.

7. The proximity detector of claim 1 wherein said tracking signal is brought to a level which is at a fixed offset from said magnetic field signal in response to changes in state of said comparator output signal.

8. The proximity detector of claim 1 wherein said magnetic field signal is brought to a level which is at a fixed offset from said tracking signal in response to changes in state of said comparator output signal.

9. The proximity detector of claim 1 wherein said peak detector comprises:
   a comparator responsive to said magnetic field signal and to said tracking signal for generating a feedback signal;
   a counter for providing a count signal in response to said feedback signal; and
   a DAC coupled to said counter for converting said count signal into an analog signal.

10. The proximity detector of claim 9 wherein said tracking signal is provided by said analog signal.

11. The proximity detector of claim 9 wherein said peak detector further comprises an offset generator for generating said tracking signal at a predetermined offset with respect to said analog signal.

12. The proximity detector of claim 1 wherein said peak detector comprises a capacitor across which said tracking signal is provided.

13. A method for detecting a ferrous article comprising the steps of:
    generating a magnetic field signal indicative of an ambient magnetic field;
    generating a tracking signal which substantially follows said magnetic field signal;
    generating an output signal which changes state when said magnetic field signal varies from said tracking signal by a predetermined amount; and
    forcing at least one of said magnetic field signal and said tracking signal towards the other one of said magnetic field signal and said tracking signal in response to transitions of said output signal.

14. The method of claim 13 wherein said forcing step comprises bringing said tracking signal to substantially the same level as said magnetic field signal in response to transitions of said output signal.

15. The method of claim 13 wherein said forcing step comprises bringing said magnetic field signal to substantially the same level as said tracking signal in response to transitions of said output signal.

16. The method of claim 13 wherein said forcing step comprises bringing said tracking signal to a level which is at a fixed offset from said magnetic field signal in response to transitions of said output signal.

17. The method of claim 13 wherein said forcing step comprises bringing said magnetic field signal to a level which is at a fixed offset from said tracking signal in response to transitions of said output signal.

18. The method of claim 13 wherein the step of generating said tracking signal comprises:
    comparing said magnetic field signal to said tracking signal to generate a feedback signal;
    counting with a counter in response to said feedback signal to provide a count signal; and
    converting said count signal to said tracking signal.

19. The method of claim 18 further comprising the step of generating a threshold signal at a predetermined offset with respect to said tracking signal and using said threshold signal to generate said output signal.

20. The method of claim 19 wherein said tracking signal level and said threshold signal level are interchanged in respond to output signal transitions.

* * * * *

UNITED STATES PATENT AND TRADEMARK OFFICE
CERTIFICATE OF CORRECTION

PATENT NO. : 6,693,419 B2  Page 1 of 1
DATED : February 17, 2004
INVENTOR(S) : Jason T. Stauth et al.

It is certified that error appears in the above-identified patent and that said Letters Patent is hereby corrected as shown below:

Column 2,
Lines 17 and 22, delete "100 mV" and replace with -- 10mV --.

Column 5,
Line 44, delete "to first" and replace with -- to a first --.

Column 7,
Line 64, delete "ti" and replace with -- t1 --.

Column 12,
Line 52, delete "in order to" and replace with -- in order --.

Column 13,
Lines 2 and 3, delete "signal. When the poscomp signal is at a first positive peak, as shown. Once" and replace with -- signal. Once --.

Column 16,
Line 57, delete "respond" and replace with -- response --.

Signed and Sealed this

Fifteenth Day of June, 2004

JON W. DUDAS
*Acting Director of the United States Patent and Trademark Office*